July 10, 1951 J. I. BELLAMY 2,559,702

SELECTOR SWITCHING SYSTEM

Filed Feb. 23, 1946 10 Sheets-Sheet 1

Inventor:
John I. Bellamy
By C. L. S[illegible]
Attorney

July 10, 1951 J. I. BELLAMY 2,559,702

SELECTOR SWITCHING SYSTEM

Filed Feb. 23, 1946 10 Sheets-Sheet 2

Inventor:
John I. Bellamy
By C. A. Sofer
Attorney

July 10, 1951 J. I. BELLAMY 2,559,702

SELECTOR SWITCHING SYSTEM

Filed Feb. 23, 1946 10 Sheets-Sheet 3

Inventor:
John I. Bellamy
By C. P. Sofer
Attorney

SELECTOR SWITCHING SYSTEM

Filed Feb. 23, 1946

10 Sheets-Sheet 4

Inventor:
John I. Bellamy
By [signature]
Attorney

July 10, 1951 J. I. BELLAMY 2,559,702

SELECTOR SWITCHING SYSTEM

Filed Feb. 23, 1946 10 Sheets-Sheet 5

Inventor:
John I. Bellamy
By C. P. Sofer
Attorney

July 10, 1951 — J. I. BELLAMY — 2,559,702

SELECTOR SWITCHING SYSTEM

Filed Feb. 23, 1946 — 10 Sheets-Sheet 6

Inventor:
John I. Bellamy
By C. P. Soper
Attorney

Inventor:
John I. Bellamy
By C. P. Soper
Attorney

July 10, 1951 J. I. BELLAMY 2,559,702

SELECTOR SWITCHING SYSTEM

Filed Feb. 23, 1946 10 Sheets-Sheet 8

Inventor:
John I. Bellamy
By C. P. Soper
Attorney

July 10, 1951 J. I. BELLAMY 2,559,702
SELECTOR SWITCHING SYSTEM
Filed Feb. 23, 1946 10 Sheets-Sheet 9
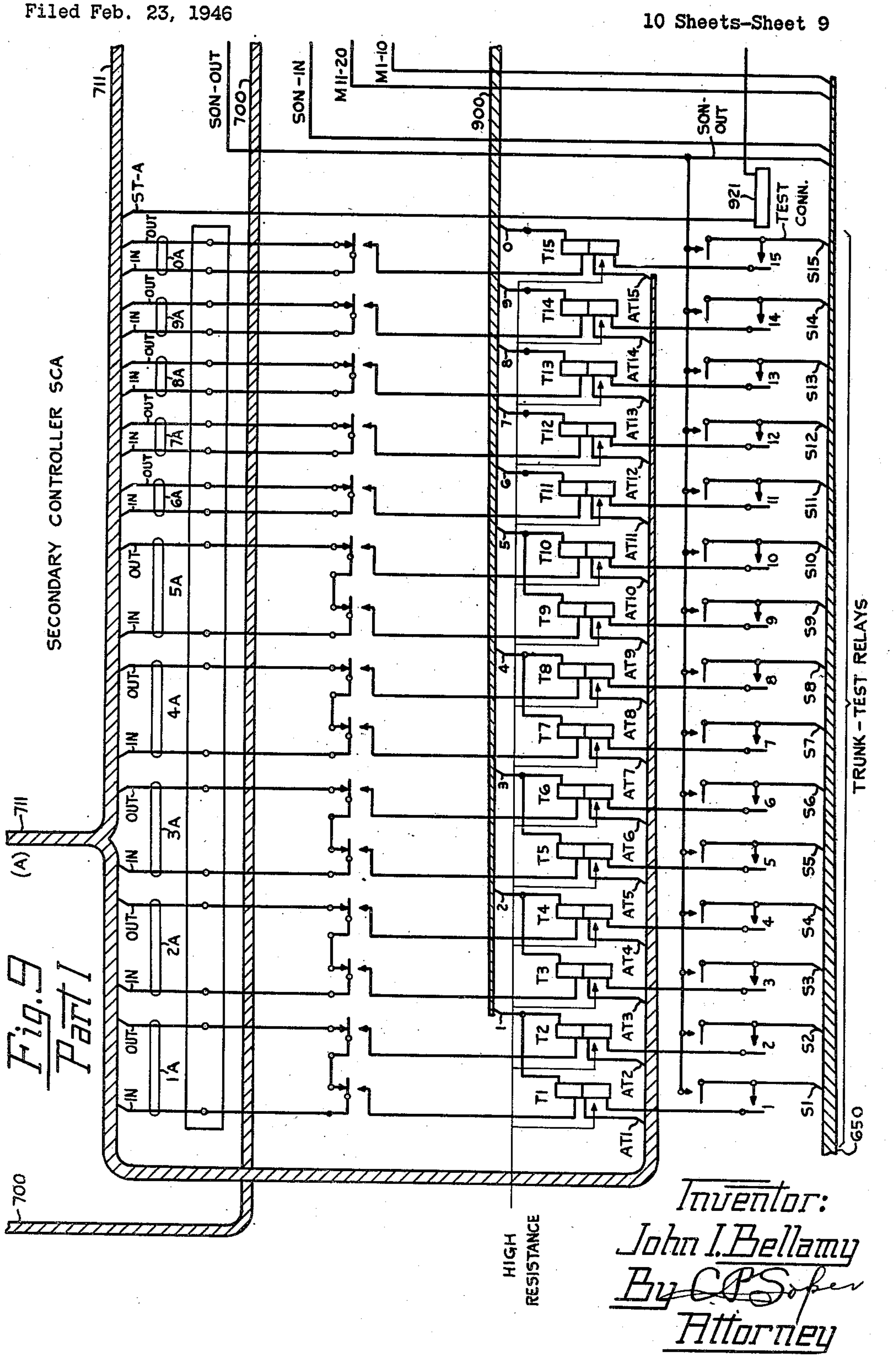
Fig. 9 Part 1
Inventor:
John I. Bellamy
By C P Soper
Attorney July 10, 1951 J. I. BELLAMY 2,559,702
SELECTOR SWITCHING SYSTEM
Filed Feb. 23, 1946 10 Sheets-Sheet 10
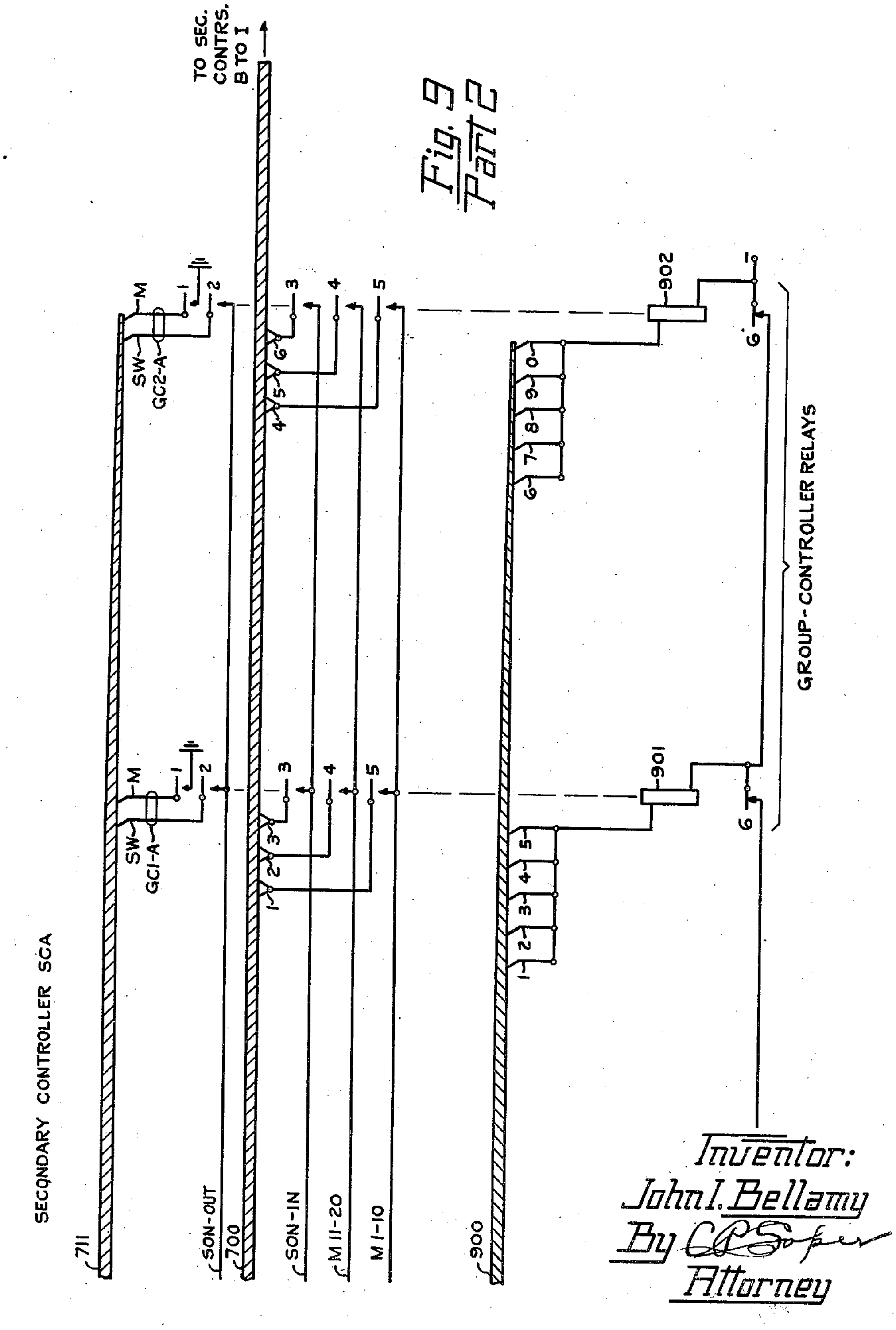
Fig. 9 Part 2
Inventor:
John I. Bellamy
By C. P. Soper
Attorney Patented July 10, 1951

2,559,702

UNITED STATES PATENT OFFICE 2,559,702

SELECTOR SWITCHING SYSTEM

John I. Bellamy, Brookfield, Ill., assignor to Kellogg Switchboard and Supply Company, Chicago, Ill., a corporation of Illinois Application February 23, 1946, Serial No. 649,595

25 Claims. (Cl. 179—18)

This invention relates to selector switching systems, being concerned more particularly with selector switching systems employed at selector switching stages in automatic telephone systems and the like to interconnect any calling incoming trunk with an idle outgoing trunk in any called numerical group.

The general object of the invention is to provide an improved selector switching system of the type employing a group of tandem-related subgrouped primary and secondary switches.

GENERAL DESCRIPTION

This application is a continuation in part of my prior application for Selector Switching Systems, Serial No. 531,949, filed April 20, 1944, now Patent No. 2,400,530, issued May 21, 1946.

Features of improvement over my above-noted prior application include the following:

1. A considerable reduction in group-controller equipment, and in the relay equipment required at any of the primary or secondary subgroups for individualizing any such subgroup with any group controller, is effected by arranging any group controller to handle calls to any one of a plurality of numerical groups of outgoing trunk lines. The group controllers are accordingly substantially reduced in number (from ten to two in the illustrated example). In the improved group-controller arrangement, suitable relay apparatus is provided for effectively associating any seized group controller with any outgoing numerical trunk group over which it may preside, thereby adapting it for operation accordingly.

2. As a current-saving feature, suitable relay arrangements are provided for energizing the test relays of idle outgoing trunks by numerical groups, the energization of any such relays of any numerical group, being dependent upon the receipt of a call for such numerical group.

3. In order to avoid the possibility of false operation of the select magnets at the primary and secondary subgroups over what may be termed "sneak" circuit paths, such as may exist with the multipled magnet-wire interconnections within the spread cable in the first embodiment shown in my previously-noted prior application, as when one or more current-supply fuses are out, an improved circuit arrangement is provided for operating in series all primary and secondary select magnets which are to operate incidental to the completion of a single connection, and for operating all such select magnets from a single fused source of operating current. This arrangement includes circuit apparatus for individualizing a group controller with common magnet conductors at the primary subgroup at which the call being handled is waiting, and with common magnet conductors at the secondary subgroup through which the waiting call is to pass.

4. Each group controller includes an efficient simplified relay arrangement for allotting first choice to the several secondary subgroups in succession, whereby the traffic is offered to them in generally uniform proportions.

Other objects and features of the invention, for the most part incidental to the features of improvement enumerated above, will appear upon a further perusal of the specification.

It has been chosen to illustrate this invention in connection with a selector switching stage generally similar to that disclosed in Figs. 1 to 8 of my previously-noted prior application Serial No. 531,949.

THE DRAWINGS

Figs. 3 to 9 are circuit drawings of portions of the equipment indicated in Fig. 2;

Figs. 3 to 9 are intended to be assembled.

Figure 1:
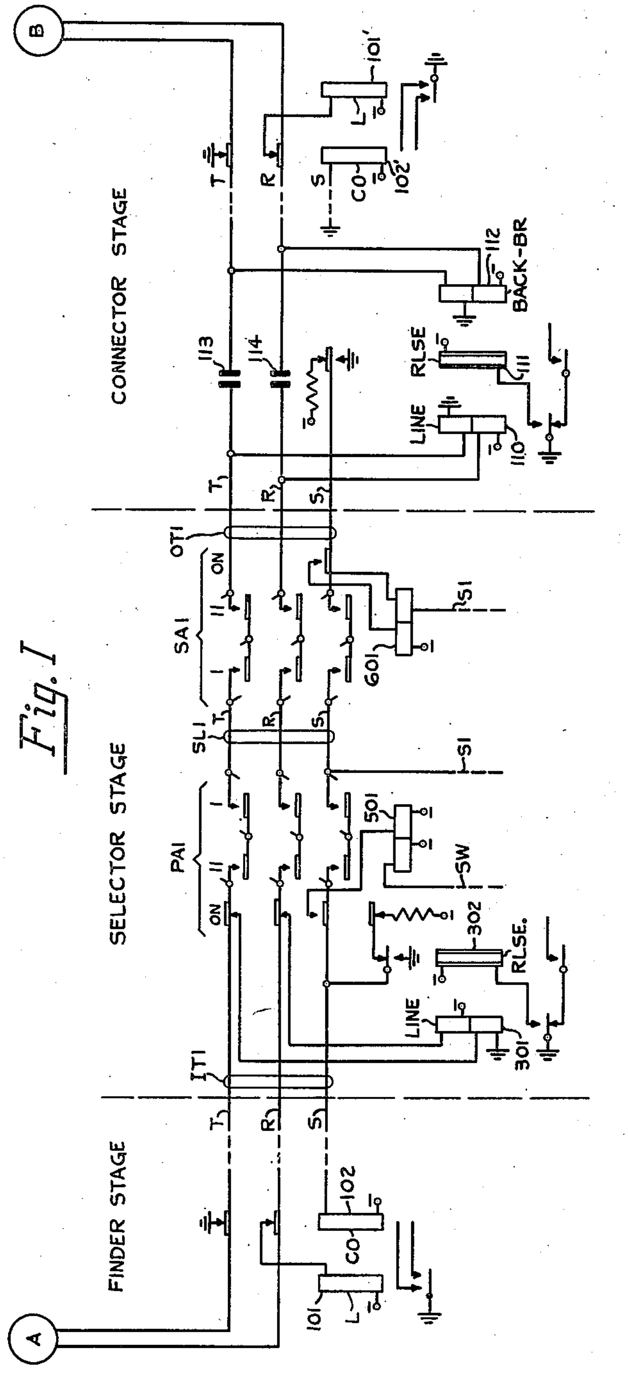
Fig. 1 is a call-through diagram showing a connection completed from the calling line to a called line by way of a selector stage employing a selector system according to the invention.
Figure 10:
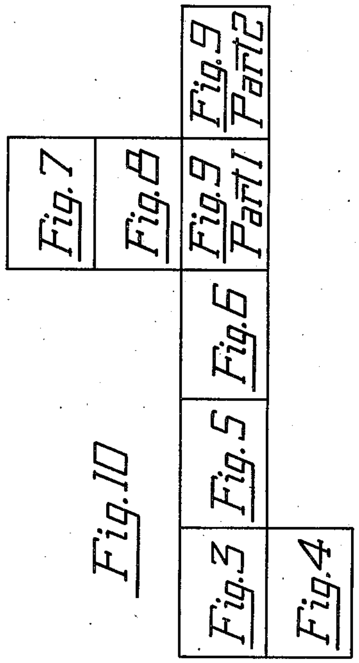
Fig. 10 shows the way

As disclosed, the selector system employs twenty-point, three-wire switches generally as disclosed in my application for Automatic Telephone Switches, Serial No. 524,816, filed March 1, 1944, now U. S. Patent No. 2,490,665, granted December 6, 1949 but somewhat modified as will be hereinafter described.

THE PRIMARY-SECONDARY ARRANGEMENT

The primary and secondary switches are arranged "face-to-face" at the selector stage, and interconnected by selector links. That is, each primary switch serves as the terminal point for an incoming trunk, and has access (in common with other switches of the same primary subgroup) to twenty selector links, and each secondary switch serves as the beginning point of an outgoing trunk and has access (in common with the other switches of the same secondary subgroup) to twenty selector links. This arrangement is illustrated best in Fig. 2 wherein nine primary subgroups of switches, A to I, are indicated and nine secondary subgroups of switches A to I, are indicated. Primary subgroups C to H and secondary subgroups C to H are omitted from the drawing for the sake of simplicity and to conserve drawing space. Since each subgroup of primary or secondary switches may have access to twenty selector links, the number of selector links is twenty times the number of primary or secondary subgroups. In the illustrative example, the nine primary and nine secondary subgroups (A to I) provide for a total of 180 selector links. In this arrangement, the number of selector links may vary from forty to four hundred, according to the traffic to be carried by the primary-secondary group of switches, for the number of subgroups can vary from two to twenty.

The number of primary or secondary switches in a subgroup has more or less arbitrarily been set at fifteen. By this arrangement, only fifteen of the twenty selector links served by a primary or a secondary subgroup can be in use at the same time, whereby the selector links are operated at a very low traffic density and a consequently low lost-call rate, which is in keeping with their comparative low cost.

Figure 2:
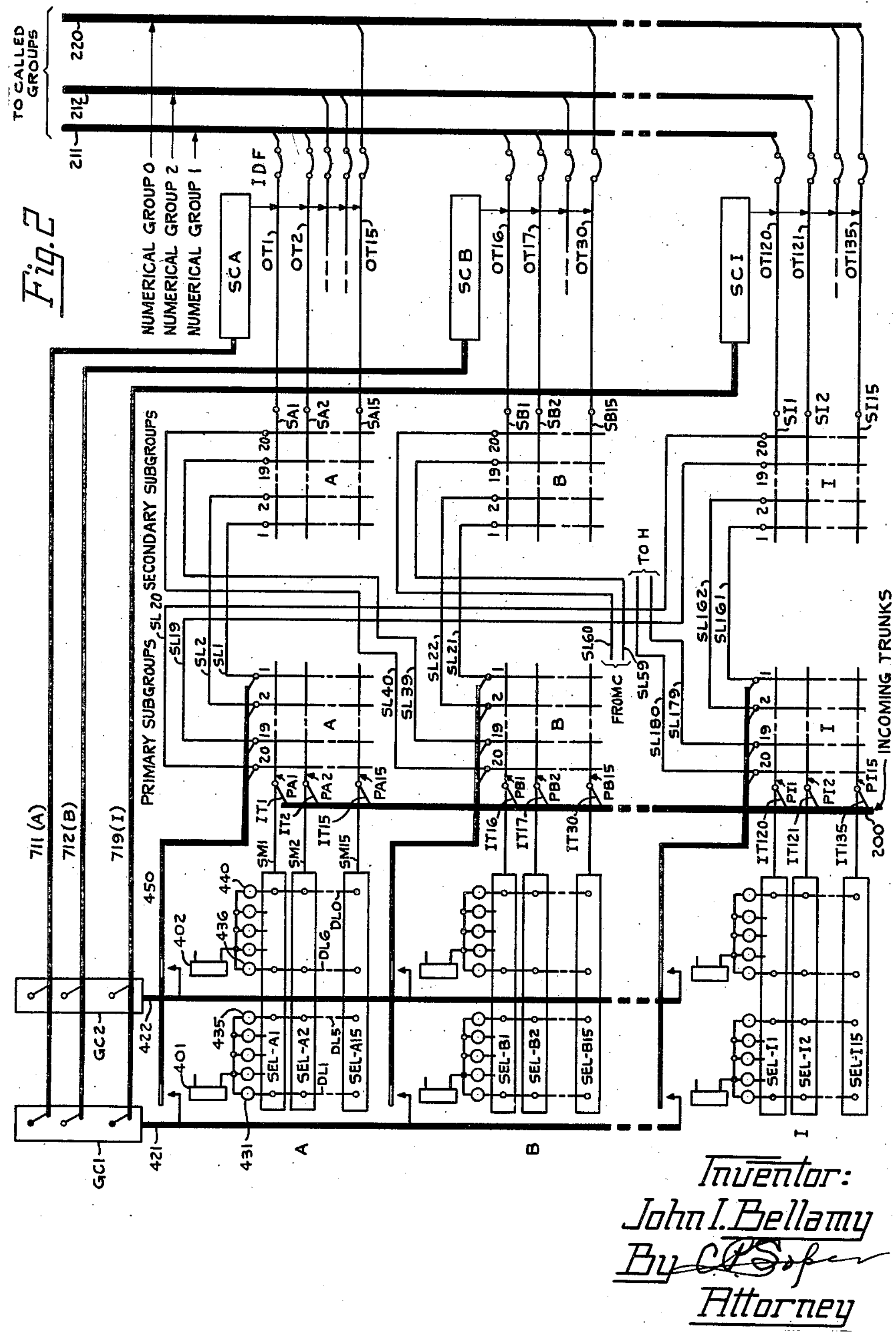
Fig. 2 is a schematic trunking diagram illustrating the general arrangement of the improved selector system.

In Fig. 2, the primary switches are represented by horizontal lines PA1 to PA15 for primary subgroup A, PB1 to PB15 for primary subgroup B, and PI1 to PI15 for primary subgroup I. The secondary switches are represented by horizontal lines SA1 to SA15 for secondary subgroups A, SB1 to SB15 for secondary subgroup B, and SI1 to SI15 for secondary subgroup I. The vertical lines extending across a subgroup represent the twenty link outlets of the subgroup by way of the twenty contact sets of any switch in such subgroup. The common outlet (or inlet) terminals of a subgroup are shown at the top, numbered 1 to 20. A few of the 180 selector links are shown interconnecting primary-subgroup terminals with secondary-subgroup terminals.

The nine primary subgroups, A to I, of Fig. 2, with fifteen primary trunks each serve as terminating points for 135 incoming trunks IT1 to IT135. Similarly, the nine secondary subgroups serve as starting points for 135 outgoing trunks OT1 to OT135. The selector links are "spread" between the primary and secondary subgroups on the basis of each primary subgroup having access to at least one link extending to each secondary subgroup, and vice versa. When only two primary and two secondary subgroups are required, half the links from any primary subgroup extend to one secondary subgroup, the remaining half to the other. When twenty primary and twenty secondary subgroups are required, the twenty links from any primary subgroup extend respectively to the twenty secondary subgroups. For each intermediate number of primary and secondary subgroups, a separate spreading arrangement may be employed, as will be readily understood. For nine primary and nine secondary subgroups, as assumed herein, each primary subgroup has access to three links extending to each of two of the secondary subgroups, and two links extending to each of the other seven secondary subgroups.

The following table shows the general spread arrangement for each number of primary and secondary subgroups from two to twenty:

TABLE 1

| No. of Subgroups | No. of Links From Any Primary Subgroup To The Secondary Subgroups |
|---|---|
| 2 | 10 to each |
| 3 | 7 each to two; 6 to one |
| 4 | 5 to each |
| 5 | 4 to each |
| 6 | 4 each to two; 3 each to four |
| 7 | 3 each to six; 2 to one |
| 8 | 3 each to four; 2 each to four |
| 9 | 3 each to two; 2 each to seven |
| 10 | 2 to each |
| 11 | 2 each to nine; 1 each to two |
| 12 | 2 each to eight; 1 each to four |
| 13 | 2 each to seven; 1 each to six |
| 14 | 2 each to six; 1 each to eight |
| 15 | 2 each to five; 1 each to ten |
| 16 | 2 each to four; 1 each to twelve |
| 17 | 2 each to three; 1 each to fourteen |
| 18 | 2 each to two; 1 each to sixteen |
| 19 | 2 to one; 1 each to eighteen |
| 20 | 1 to each |

In carrying out any of the general spread arrangements indicated in Table 1, an orderly specific arrangement may be adopted wherein the selector link extending from any primary subgroup terminal extends to the correspondingly numbered (1 to 20) terminal in the desired secondary subgroup, and wherein the spread of selector links extending from any primary subgroup begins with the corresponding secondary subgroup.

The following table gives the specific arrangement chosen and considered preferable for the system of Fig. 2, wherein 180 selector links interconnect nine primary and secondary subgroups A to I.

TABLE 2

| Sel. Link | From Pri. Term. | To Sec. Term. | Sel. Link | From Pri. Term. | To Sec. Term. | Sel. Link | From Pri. Term. | To Sec. Term. |
|---|---|---|---|---|---|---|---|---|
| 1 | A1 | A1 | 21 | B1 | B1 | 41 | C1 | C1 |
| 2 | A2 | A2 | 22 | B2 | B2 | 42 | C2 | C2 |
| 3 | A3 | A3 | 23 | B3 | B3 | 43 | C3 | C3 |
| 4 | A4 | B4 | 24 | B4 | C4 | 44 | C4 | D4 |
| 5 | A5 | B5 | 25 | B5 | C5 | 45 | C5 | D5 |
| 6 | A6 | B6 | 26 | B6 | C6 | 46 | C6 | D6 |
| 7 | A7 | C7 | 27 | B7 | D7 | 47 | C7 | E7 |
| 8 | A8 | C8 | 28 | B8 | D8 | 48 | C8 | E8 |
| 9 | A9 | D9 | 29 | B9 | E9 | 49 | C9 | F9 |
| 10 | A10 | D10 | 30 | B10 | E10 | 50 | C10 | F10 |
| 11 | A11 | E11 | 31 | B11 | F11 | 51 | C11 | G11 |
| 12 | A12 | E12 | 32 | B12 | F12 | 52 | C12 | G12 |
| 13 | A13 | F13 | 33 | B13 | G13 | 53 | C13 | H13 |
| 14 | A14 | F14 | 34 | B14 | G14 | 54 | C14 | H14 |
| 15 | A15 | G15 | 35 | B15 | H15 | 55 | C15 | I15 |
| 16 | A16 | G16 | 36 | B16 | H16 | 56 | C16 | I16 |
| 17 | A17 | H17 | 37 | B17 | I17 | 57 | C17 | A17 |
| 18 | A18 | H18 | 38 | B18 | I18 | 58 | C18 | A18 |
| 19 | A19 | I19 | 39 | B19 | A19 | 59 | C19 | B19 |
| 20 | A20 | I20 | 40 | B20 | A20 | 60 | C20 | B20 |
| 61 | D1 | D1 | 81 | E1 | E1 | 101 | F1 | F1 |
| 62 | D2 | D2 | 82 | E2 | E2 | 102 | F2 | F2 |
| 63 | D3 | D3 | 83 | E3 | E3 | 103 | F3 | F3 |
| 64 | D4 | E4 | 84 | E4 | F4 | 104 | F4 | G4 |
| 65 | D5 | E5 | 85 | E5 | F5 | 105 | F5 | G5 |
| 66 | D6 | E6 | 86 | E6 | F6 | 106 | F6 | G6 |
| 67 | D7 | F7 | 87 | E7 | G7 | 107 | F7 | H7 |
| 68 | D8 | F8 | 88 | E8 | G8 | 108 | F8 | H8 |
| 69 | D9 | G9 | 89 | E9 | H9 | 109 | F9 | I9 |
| 70 | D10 | G10 | 90 | E10 | H10 | 110 | F10 | I10 |
| 71 | D11 | H11 | 91 | E11 | I11 | 111 | F11 | A11 |
| 72 | D12 | H12 | 92 | E12 | I12 | 112 | F12 | A12 |
| 73 | D13 | I13 | 93 | E13 | A13 | 113 | F13 | B13 |
| 74 | D14 | I14 | 94 | E14 | A14 | 114 | F14 | B14 |
| 75 | D15 | A15 | 95 | E15 | B15 | 115 | F15 | C15 |
| 76 | D16 | A16 | 96 | E16 | B16 | 116 | F16 | C16 |
| 77 | D17 | B17 | 97 | E17 | C17 | 117 | F17 | D17 |
| 78 | D18 | B18 | 98 | E18 | C18 | 118 | F18 | D18 |
| 79 | D19 | C19 | 99 | E19 | D19 | 119 | F19 | E19 |
| 80 | D20 | C20 | 100 | E20 | D20 | 120 | F20 | E20 |
| 121 | G1 | G1 | 141 | H1 | H1 | 161 | I1 | I1 |
| 122 | G2 | G2 | 142 | H2 | H2 | 162 | I2 | I2 |
| 123 | G3 | G3 | 143 | H3 | H3 | 163 | I3 | I3 |
| 124 | G4 | H4 | 144 | H4 | I4 | 164 | I4 | A4 |
| 125 | G5 | H5 | 145 | H5 | I5 | 165 | I5 | A5 |
| 126 | G6 | H6 | 146 | H6 | I6 | 166 | I6 | A6 |
| 127 | G7 | I7 | 147 | H7 | A7 | 167 | I7 | B7 |
| 128 | G8 | I8 | 148 | H8 | A8 | 168 | I8 | B8 |
| 129 | G9 | A9 | 149 | H9 | B9 | 169 | I9 | C9 |
| 130 | G10 | A10 | 150 | H10 | B10 | 170 | I10 | C10 |
| 131 | G11 | B11 | 151 | H11 | C11 | 171 | I11 | D11 |
| 132 | G12 | B12 | 152 | H12 | C12 | 172 | I12 | D12 |
| 133 | G13 | C13 | 153 | H13 | D13 | 173 | I13 | E13 |
| 134 | G14 | C14 | 154 | H14 | D14 | 174 | I14 | E14 |
| 135 | G15 | D15 | 155 | H15 | E15 | 175 | I15 | F15 |
| 136 | G16 | D16 | 156 | H16 | E16 | 176 | I16 | F16 |
| 137 | G17 | E17 | 157 | H17 | F17 | 177 | I17 | G17 |
| 138 | G18 | E18 | 158 | H18 | F18 | 178 | I18 | G18 |
| 139 | G19 | F19 | 159 | H19 | G19 | 179 | I19 | H19 |
| 140 | G20 | F20 | 160 | H20 | G20 | 180 | I20 | H20 |

Numerical Grouping of Outgoing Trunks

The outgoing trunks OT1 to OT135 of Fig. 2 may be divided into as many separately numbered groups as desired, each trunk group leading to a separate destination, usually a separate group of called lines. Each such separate group of outgoing trunks may be designated a numerical group, in that each group bears a separate number, or digit, designation. It is assumed that the outgoing trunks indicated in Fig. 2 are divided into ten numerical groups, of which groups 1, 2, and 0 are represented respectively by cables 211, 212, and 220.

For convenience in grouping, the outgoing trunks OT1 to OT135 may be passed through an intermediate distributing frame indicated at IDF, across which each trunk may be carried by a separate jumper connection. The preferred assignment of outgoing trunks to the numerical groups is such that each numerical group contains as nearly as possible the same number of trunks from each secondary subgroup, an ideal rarely obtaining in practice.

The 135 outgoing trunks OT1 to OT135 provide an average of thirteen and one-half trunks for each of the ten outgoing numerical groups 1 to 0. Some numerical groups may contain only ten trunks, or fewer, while other numerical groups may contain twenty trunks or more, all depending upon the traffic requirements.

The Group-Controller Arrangement

As indicated in Fig. 2, two group controllers, GC1 and GC2, are arranged to handle the establishment of connections through the selector stage. As will hereinafter appear, group controller GC1 handles calls directed to any one of the first five outgoing numerical groups, while group controller GC2 handles calls directed to any one of the last five outgoing numerical groups. The ten group controllers used in the similar embodiment of my previously noted prior application Serial No. 531,949, are thus reduced to two. This reduction in the number of group controllers is based on mathematical calculations, not necessary to reproduce here, which show that a single group controller can handle, on a one-at-a-time basis, at least the number of calls which can be expected to be directed to five numerical groups served by a selector switching stage of the size specifically illustrated. Selector switching stages considerably smaller than the one specifically illustrated may be served entirely by a single group controller, while still larger selector switching stages may require three or more group controllers, the number required being calculated from the number of calls expected to pass through the selector switching stage during the so-called busy hour.

The previously-noted calculations indicate that a single group controller can handle up to three thousand calls during the busy hour with not more than one lost call in a thousand due to unavailability of a group controller, provided the operate cycle of a group controller does not exceed .1 second, and provided the start relays of the selectors (see relay 304, Fig. 3) are so adjusted that .25 second of the usual interdigit interval remains after the operation of any such start relay. Each group controller is arranged to direct any primary switch in any subgroup to extend a connection to any outgoing trunk in any one of the numerical groups over which it presides, by way of a selector link and the concerned secondary switch. Any operating group controller is assisted in selection of an idle outgoing trunk by one or another of the nine secondary controllers SCA to SCI, according to the secondary subgroup through which connection with an idle trunk in the called numerical group is located. The secondary controllers are connected with the group controllers through the nine cables 711 to 719. Since each secondary subgroup has its own secondary controller, each secondary subgroup is able to act as a unit independent of the others.

The Selectors

As shown in Fig. 2, selectors SEL—A1 to SEL—A115 are individual respectively to the primary switches PA1 to PI15. These selectors are divided into nine subgroups A to I, fifteen selectors to a subgroup, in accordance with the division of the primary switches into subgroups. The selectors of any subgroup are connected with the respective switches of the corresponding primary subgroup by way of selector multiples, such as SM1 to SM15 for selector subgroup A. Each selector includes an arrangement of control relays (Fig. 3) for performing the necessary control functions, and for transmitting impulses to a register device, through which selection is made of one or another of ten so-called dial leads, one for each separate digit value employed to direct a call through the selector stage. A separate one of ten digit values is employed for each of the ten numerical groups 1 to 0 of outgoing trunks.

Each subgroup of selectors is provided with two connecting relays, such as relays 401 and 402 of subgroup A, to which the dial leads DL1 to DL0 of that selector subgroup extend, in two groups of five each. Through the selection and operation of one or another of the relays 401 and 402, connection is made with the corresponding one of the group controllers GC1 and GC2, by way of a local cable such as 450 and the concerned group cable 421 and 422, whereby the requisite number of connections is made to the group controller to enable the latter to control the extension of the connection to an idle trunk in the called numerical group.

Each selector subgroup is provided with its own set of dial leads, such as dial leads DL1 to DL0 for selector subgroup A. There is one such dial lead for each outgoing numerical group. Dial leads DL1 to DL5 of selector subgroup A all extend to the same group-controller relay 401. Similarly, leads DL6 to DL0 all extend to the same group-controller relay 402. Individual series relays 431 to 440 are employed to distinguish between the five dial leads extending to a single relay such as 401 and 402, whereby either of the group controllers GC1 and GC2 is informed, on seizure, as to the particular numerical group currently being called therethrough.

Since each selector subgroup A to I is provided with its own set of dial leads such as DL1 to DL0, its own group of two connecting relays such as 401 and 402, and its own local cable such as 450, each selector subgroup, together with its associated primary subgroup of switches, is able to act as a unit independent of the others.

The Circuit Drawings

The circuit drawings of Figs. 3 to 9 will now be explained briefly.

Figure 3:
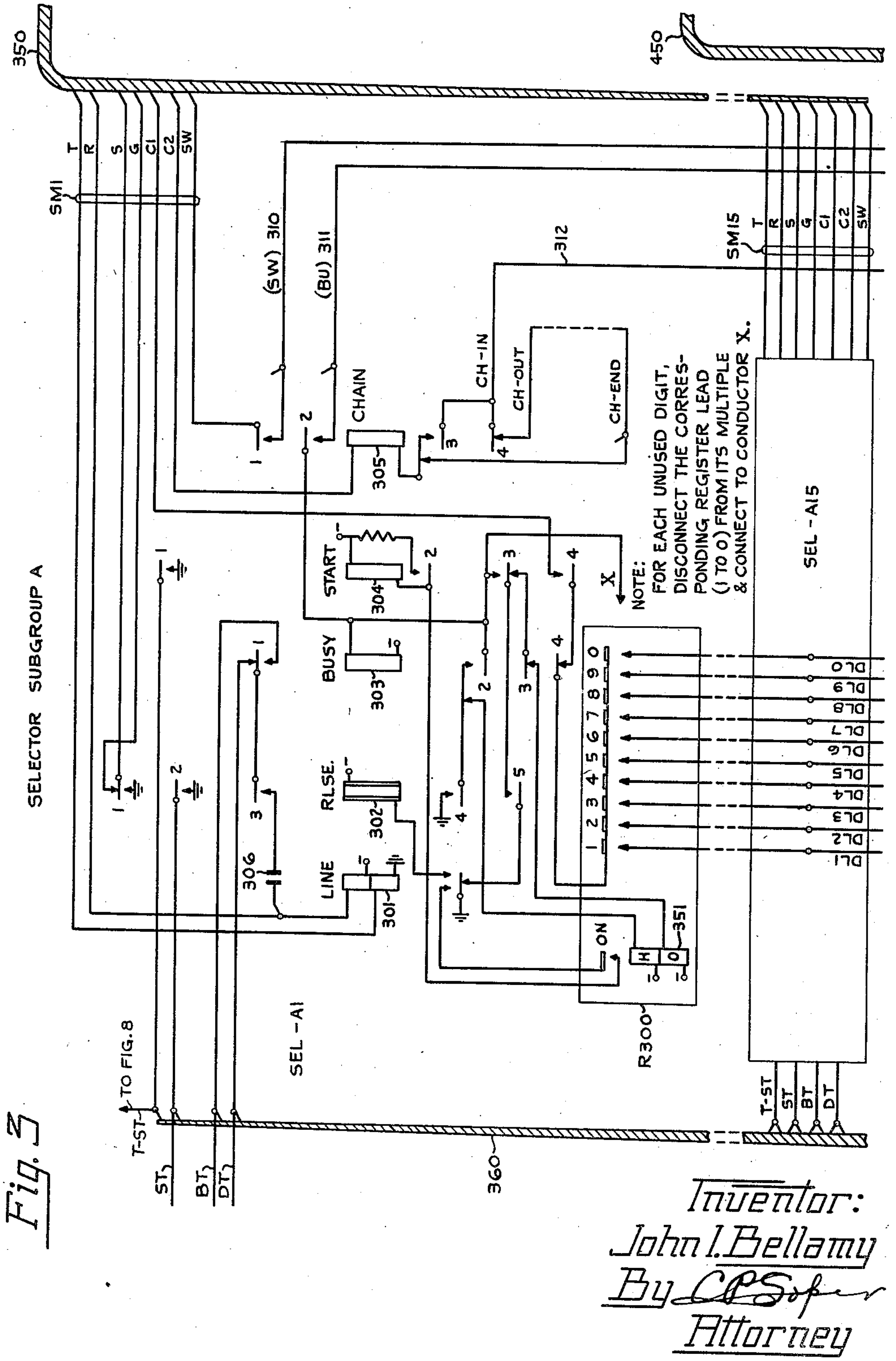

*Figure 3*

Fig. 3 shows in full the circuits of selector SEL—A1 and indicates the fifteenth selector SEL—A15 by means of a rectangle. These two selectors, together with thirteen intermediate selectors, form selector subgroup A of Fig. 2. Cable 350 contains the fifteen selector multiples SM1 to SM15, which interconnect the selectors of selector subgroup A with the respective corresponding switches of primary subgroup A, the first and last of these multiples being shown in Figs. 3 and 5. Fig. 3 also shows dial leads DL1 to DL0 which are multiply connected to the contacts of the registers such as R300, a separate such register being provided for each selector.

Figure 4:
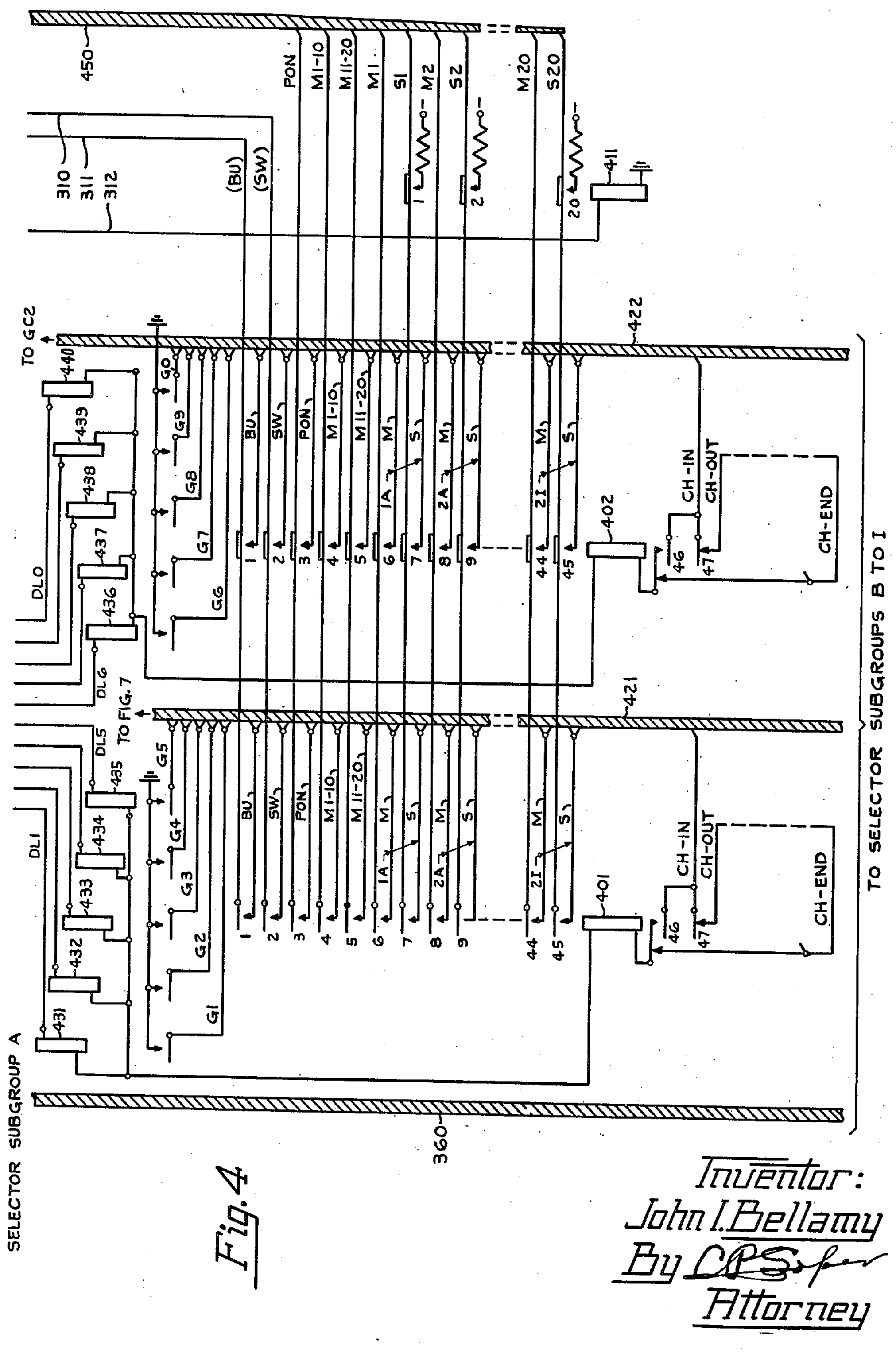

*Figure 4*

Fig. 4 shows the group-controller connecting relays 401 and 402 to which the dial leads DL1 to DL0 of selector subgroup A extend, together with group relays 431 to 440, connected respectively in series with the dial leads. Either of relays 401 and 402, when operated over any associated dial lead, from any selector in selector subgroup A, operates to interconnect conductors 310, 311, and the conductors in subgroup-A cable 450, to conductors in the associated one of the cables 421 and 422, extending respectively to group controllers GC1 and GC2.

Relays 431 to 440 serve respectively to ground conductors G1 to G0 to notify the concerned seized group controller of the identity of the group being called.

Figure 5:
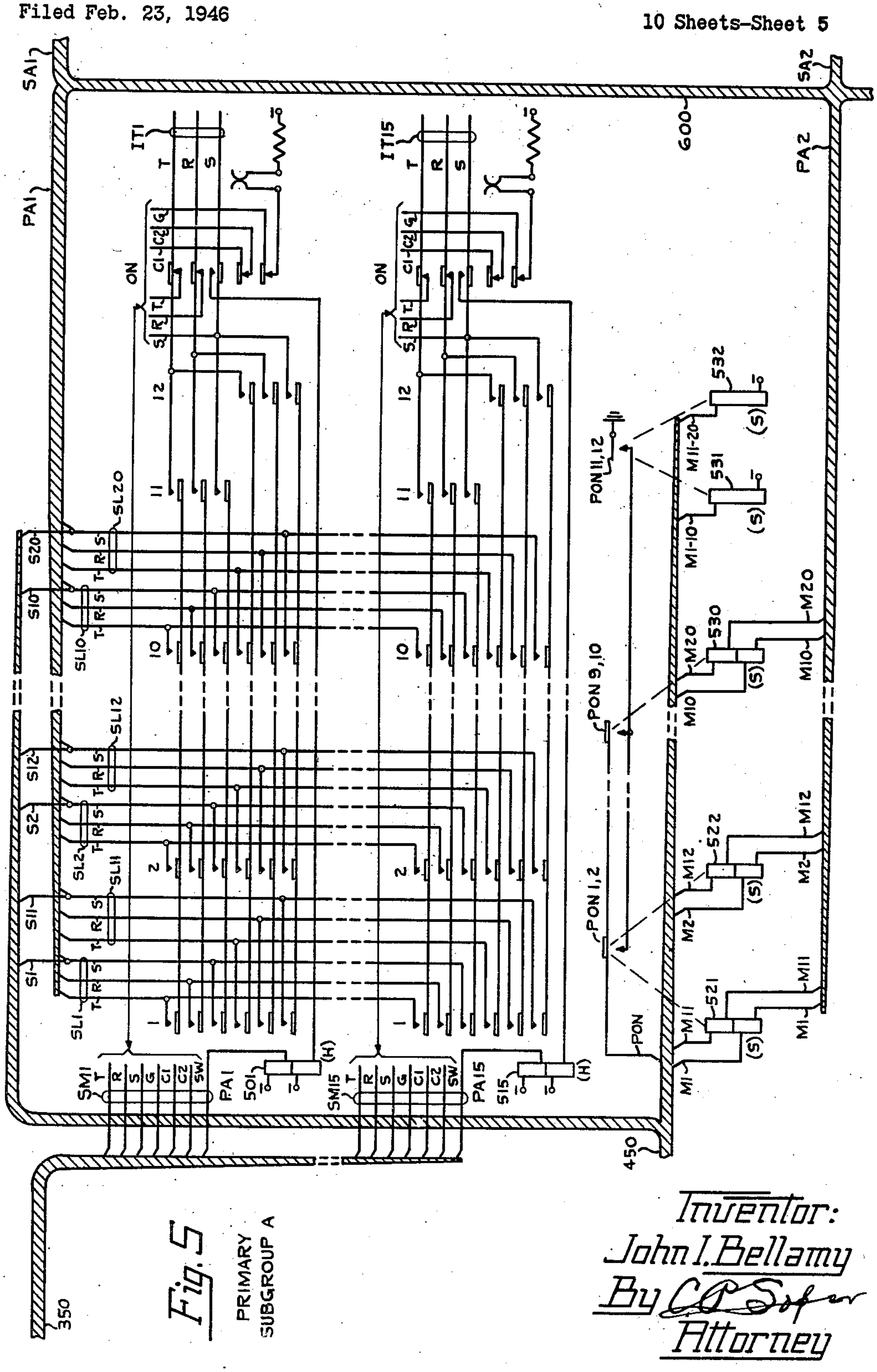
Figure 6:
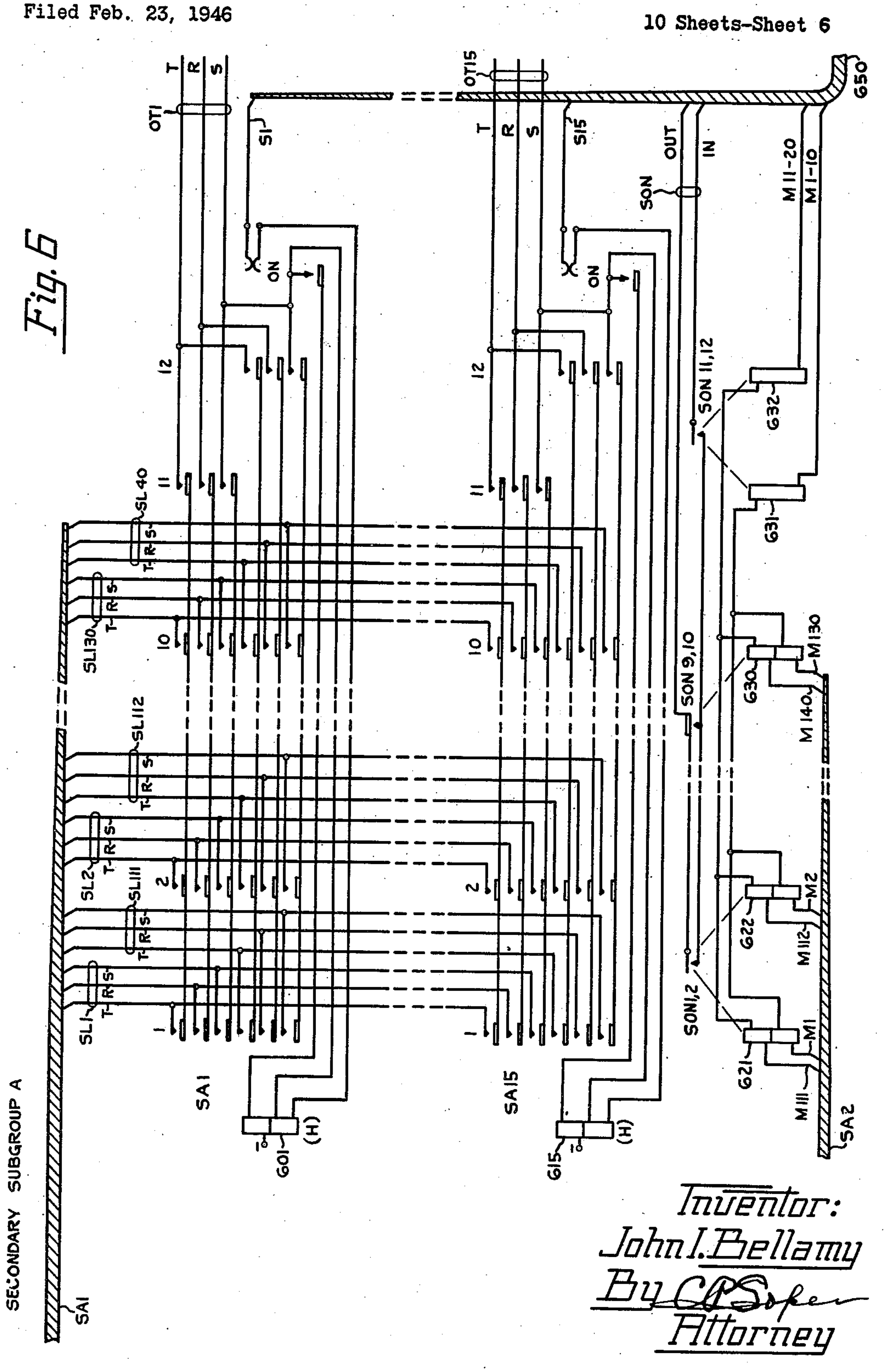

*Figures 5 and 6*

Fig. 5 shows the circuit arrangement of primary subgroup A of Fig. 2, primary switches PA1 and PA15 being shown. The intermediate primary switches of this subgroup are omitted to conserve drawing space. Primary switch PA1, for example, contains twelve selective stackups of contacts 1 to 12 (stackups 3 to 9 are omitted to conserve drawing space) and an off-normal stackup ON. The arrangement for selecting and operating the stackups of contacts may be generally as shown and described in my previously identified prior application Serial No. 524,816, except that twelve selective stackups of contacts are provided for each switch, and twelve select magnets are provided, one for each of the stackups of contacts 1 to 12. The select magnets for stackups 1, 2, 10, 11, and 12 are magnets 521, 522, 530, 531, and 532. Select magnet 531, or 532 associated respectively with stackups 11 and 12 of any primary switch of the subgroup, is operated (along with one of the magnets 521 to 530) depending upon whether the upper contact set or the lower contact set of an operated stackup 1 to 10 is to be effective.

For the operation, and maintenance, of the selected combination of stackups, each switch is provided with a hold magnet (501 for switch PA1, and 515 for switch PA15).

The off-normal stackup ON of any of the switches is not a selective stackup, being operated each time the corresponding hold magnet, such as 501, is energized, irrespective of what stackup selection has been accomplished.

Each primary and each secondary subgroup of switches is preferably separately fused, and is provided with its own set of select magnets such as 521 to 532, and with its own set of six selecting shafts (not shown), whereby each such subgroup is capable of operating as a unit independent of the other subgroups.

Fig. 6 is a drawing corresponding generally to Fig. 5, but showing secondary subgroup A instead of primary subgroup A. Here again, only the first and fifteenth switches are shown, and stackups 3 to 9 are omitted. Magnets 621 to 632 correspond respectively to magnets 521 to 532; and hold magnets 601 and 615 correspond respectively to magnets 501 and 515.

Fig. 5 shows the three-conductor incoming trunks IT1 and IT15 terminating respectively in primary switches PA1 and PA15, and Fig. 6 shows the three-conductor outgoing trunks OT1 and OT15 extending respectively from secondary switches SA1 and SA15.

Assuming the primary and secondary subgroups to be mounted in superposed relation as indicated in Fig. 2, spread cable 600 extends vertically between them, and has pairs of lateral branches for the respective primary and secondary subgroups. Branches PA1 and PA2 are the lateral branches for primary subgroup A, and branches SA1 and SA2 are those for secondary subgroup A. This spread cable contains conductor sets comprising the selector links interconnecting the subgroups of primary and secondary switches according to Table 2, appearing hereinbefore. Each selector link (such as SL1 to SL20, extending from primary subgroup A) includes four conductors. These comprise a magnet conductor such as M1 to M20 in branch PA2, and the usual tip, ring, and sleeve conductors T, R, and S in branch PA1. The magnet conductor, such as M1 to M20, in any selector link is the conductor over which the one of the ten select magnets such as 521 to 530 in the primary subgroup is operated in series with the corresponding select magnet in the secondary subgroup to which such link extends.

The six contact pairs in stackups 1 to 10 of any switch comprise an upper set of three and a lower set of three, each switch having ten upper sets and ten lower sets. The upper sets represent terminal sets 1 to 10, respectively, of the subgroup, while the lower sets represent terminal sets 11 to 20, respectively. Stackup 11 of any switch is operable to render sets 1 to 10 effective, while stackup 12 is operable to render sets 11 to 20 effective.

Figure 7:
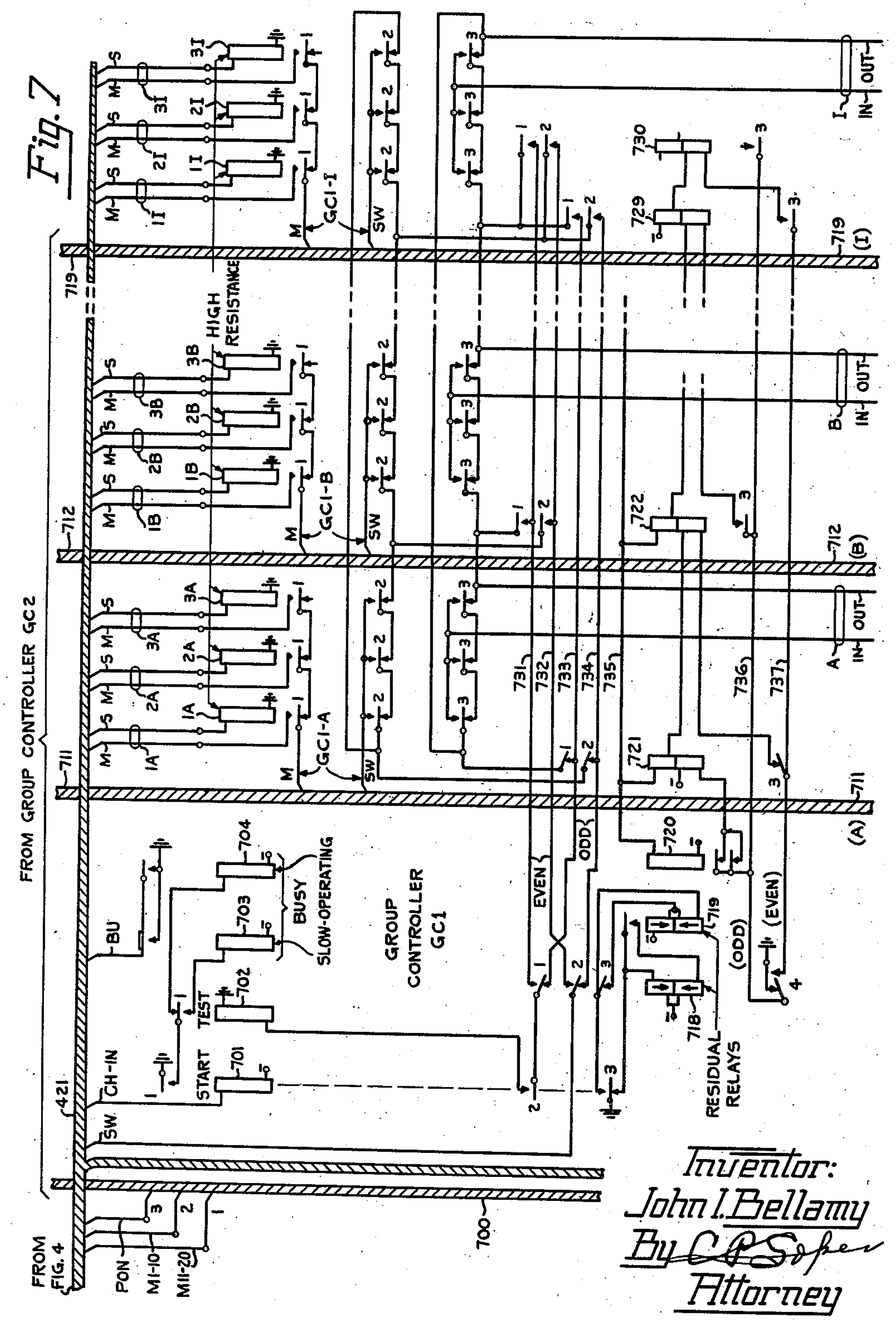

*Figure 7*

Fig. 7 shows the circuit arrangement at group controller GC1 of Fig. 2, the circuit arrangement at group controller GC2 being generally similar.

Group controller GC1 includes start and test relays 701 and 702, a pair of busy relays 703 and 704, a preference allotter comprising relays 718 to 730, and twenty-seven link-test relays 1A to 3I. The link-test relays are assigned in subgroups of three to test the links extending from a calling primary subgroup to the respective secondary subgroups. This is in accordance with preceding Table 2, wherein it will be noted that not more than three selector links extend from any primary subgroup to any secondary subgroup. Relays 1A to 3A are assigned to links extending from any calling primary subgroup to secondary subgroup A; relays 1B to 3B are assigned to links extending to secondary subgroup B; and so on, to relays 1I to 3I, which are assigned to links extending from any calling primary subgroup to secondary subgroup I.

Group controller GC1 is connected with selector subgroups A to I by the conductors in cable 421 incoming to Fig. 7, part 1, from Fig. 4. Group controller GC1 is directly interconnected with the nine secondary controllers (SCA to SCI), by conductor pairs GC1—A, GC1—B, and so forth to GC1—I, lying respectively in cables 711 to 719. These cables carry similar conductor pairs to the secondary controllers from group controller GC2. These latter conductor pairs (not shown in Fig. 7) may be termed GC2—A, GC2—B, and so forth to GC2—I, so as to indicate the group controller at which they originate, and the secondary controller to which they extend. Any one of the conductor pairs under discussion comprises a magnet (select magnet) conductor M over which ground potential is extended to effect the primary and secondary selecting operation, and a switching conductor SW over which ground potential is extended following the completion of the selecting operation to effect the prepared switching operation.

Group controller GC1 of Fig. 7 has a further pair of conductors for each secondary subgroup. These pairs are labeled A to I, and extend downwardly from Fig. 7 to the grouping relays shown in Fig. 8. It will be understood, of course, that group controller GC2 is provided with similar pairs of conductors. Each such pair is associated with the corresponding secondary branch of the test chain, and comprises conductors IN and OUT. They represent respectively the test conductor leading into the secondary subgroup and the return test conductor effectively leading back out of the secondary subgroup when such subgroup contains no idle trunk assigned to the numerical group being currently called through the group controller.

Figure 8:
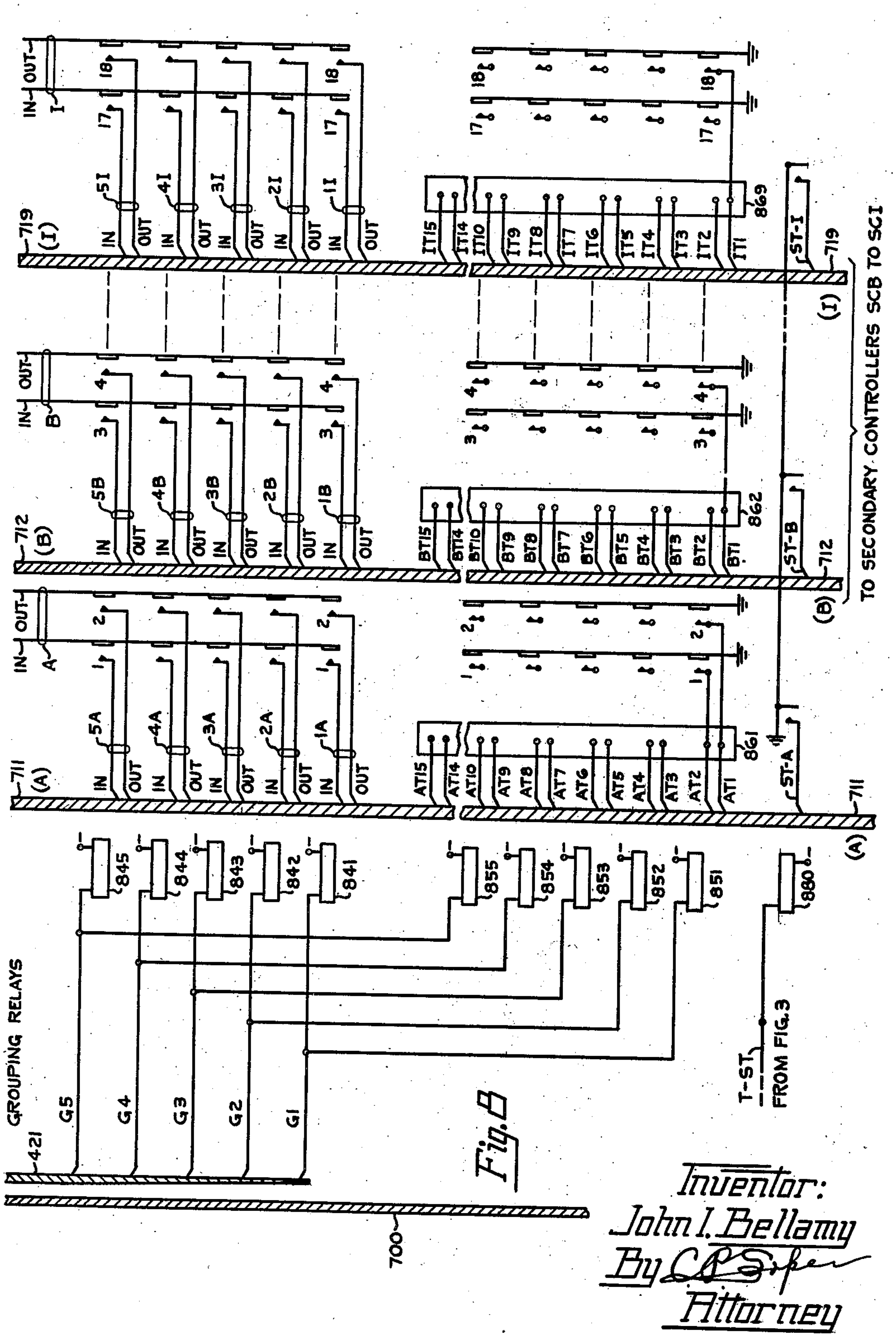

*Figure 8*

Fig. 8 shows grouping relays 841 to 845, corresponding respectively to outgoing numerical groups 1 to 5. These relays are interposed between the secondary subgroups and the conductor pairs A to I of group controller GC1, Fig. 7, to enable such group controller to be used to control the completion of a connection to any one of the first five outgoing numerical group of trunks. Grouping relays 741 to 745 are operated respectively over conductors G1 to G5 in cable 421, controlled respectively by the five relays at any selector subgroup corresponding to relays 431 to 435 at selector subgroup A, Fig. 4, according to the destination of the call occasioning the seizure of the group controller. It will be understood that five grouping relays similar to 741 to 745 are associated with the other group controller and are controlled respectively over group conductors G6 to G0 in cable 422 of Fig. 4.

When operated, any one of the relays 741 to 745 connects conductor pairs A to I of the group controller of Fig. 7 respectively to its corresponding pairs of IN and OUT test conductors extending to the secondary controllers, thereby adapting the group controller for the operation in handling a call to the concerned one of the five outgoing numerical groups assigned to it.

Fig. 8 shows also grouping relays 851 to 855, operated respectively over group conductors G1 to G5. When operated, any such relay applies ground potential, through conductors in cables 711 to 719, to a terminal of each of the secondary test relays associated with an outgoing trunk assigned to the corresponding outgoing numerical group, whereby any such test relay (see for example relays T1 to T15, Fig. 9, part 1) is operated only when a call is directed to the concerned outgoing numerical group.

Fig. 8 shows also common test start relay 880 which applies starting ground individually to the secondary controllers, thereby avoiding the possibility of confused operation of relays such as 821 in the event of an open fuse at any one of the secondary subgroups.

*Figure 9*

Fig. 9, comprising parts 1 and 2, shows secondary controller SCA of Fig. 2, the other secondary controllers being similar. Relays T1 to T15 are test relays corresponding respectively to the fifteen trunks, OT1 to OT15, outgoing from the associated secondary subgroup A. The interconnection between the outgoing trunks and relays T1 to T15 is through conductors S1 to S15 in cable 650, and by way of contacts of connecting relay 921, when operated.

Relays 901 to 902 are group-controller relays assigned respectively to group controllers GC1 and GC2. Each such group-controller relay is operable only from the corresponding group controller, and then only if the secondary controller is idle. Upon the operation of either group-controller relay 901 or 902, operations occur to mark the secondary controller busy to the other group controller, as will appear subsequently, and to initiate the operation of the switching apparatus to complete the connection.

DETAILED DESCRIPTION

The invention having been described generally, a detailed description will now be given. The operation will first be described with reference to Fig. 1.

A. Figure 1

Referring now particularly to Fig. 1, the general operations involved in setting up a connection from a calling substation A to a called substation B will now be described.

When the receiver (not shown) is removed at substation A, a direct-current bridge is established across the tip and ring conductors of the associated line, operating line relay 101 through contacts of cutoff relay 102 to cause finder action to occur at the associated finder stage. As a result of this finder action, the tip, ring, and sleeve conductors of the calling line are extended in any desired manner to an idle trunk line such as trunk line IT1 incoming to the selector stage. IT1, it may be pointed out, is shown also in Fig. 5, incoming to the primary switch PA1. The trunk line IT1 is normally marked idle by an idle-indicating battery potential applied to the sleeve conductor S thereof by way of contacts of release relay 302 and contacts in stackup ON of the associated primary switch PA1, the connection including the illustrated current-limiting resistor.

When the finder-stage extension has been made, line relay 301 associated with trunk IT1 (being a relay of selector SEL—A1, Fig. 3) operates over the calling line, causing operation of the associated release relay 302. Relay 302 disconnects the normally applied idle-indicating battery potential and substitutes ground potential to maintain, in the usual manner, the connection established through the finder stage, closing an operating circuit for cutoff relay 102. Relay 102 thereupon operates to disconnect the line-relay bridge, whereupon line relay 101 restores.

The calling subscriber may now dial the first digit in the number assigned to the line of substation B, causing the usual series of interruptions to be produced in the bridge across the calling line by the usual form of calling device. The resulting series of momentary restorations of line relay 301 causes a selecting operation to occur in a manner to be explained subsequently in connection with Fig. 3. Upon the termination of the dialing of this digit, operations occur to test the selector links such as SL1 accessible to primary switch PA1, and to test the trunks extending from the secondary switches such as SA1 to the connector-stage group containing the desired called line. The testing of sleeve conductor S of selector link SL1 occurs over the illustrated downward extension S1 thereof, while the testing of outgoing trunk OT1 is performed over its sleeve conductor S, over the indicated downward extension S1, connected therewith through the operating winding of hold magnet 601 of the associated secondary switch SA1.

Assuming that the testing operation determines that selector link SL1 and outgoing trunk OT1 are both idle, and are to be used for the connection, selecting operations occur as will be subsequently described to cause selector link SL1 to be selected by mechanism common to the primary switch PA1 and other switches in the same primary subgroup. Similar selecting operations occur in the mechanism common to secondary switch SA1 and other switches in the same secondary subgroup. When these selecting operations have been performed, the conductor labeled SW, and extending downwardly from the left-hand winding of hold magnet 501, is temporarily grounded, causing magnet 501 to operate to close the associated contact stackups 11 and 1, thereby extending the tip, ring, and sleeve conductors of incoming trunk IT1 respectively to the corresponding conductors of selector link SL1. At the same time, ground potential is temporarily applied to the lead S1 extending downwardly from the right-hand winding of hold magnet 601, thereby closing an operating circuit for this magnet over the sleeve conductor of trunk OT1, to battery through contacts of release relay 111 and the associated current-limiting resistor. Magnet 601 thereupon operates to close its contact stackups 1 and 11, further extending the connection to the tip, ring, and sleeve conductors of outgoing trunk OT1. Thereupon, line relay 110 (being a portion of the connector-stage equipment to which trunk OT1 extends) operates over the calling line and causes release relay 111 to operate. The latter relay disconnects the normally applied source of idle-indicating battery potential from sleeve conductor S of trunk OT1 and substitutes a holding ground potential.

Stackups ON in switches PA1 and SA1 are actuated by the said operation of their respective magnets 501 and 601. Ground potential on the sleeve conductor of the extended connection is effective to energize the hold winding of magnet 601 through the associated off-normal contacts. Similarly, the hold winding of magnet 501 is energized through its associated off-normal contacts over the sleeve conductor. The off-normal stackup ON of switch PA1 also disconnects the associated line relay 301, following which relays 301 and 302 restore. The holding ground potential is subsequently maintained by release relay 111, through which magnets 601 and 501, and cutoff relay 102, are maintained operated, along with any holding magnets or relays (not shown) required at the finder stage.

The temporary circuits closed to select and operate the hold magnets 501 and 601 are shortly opened, leaving the connection maintained by the above-noted holding ground potential on the sleeve conductor thereof. The lower pair of contacts in stackup ON of switch PA1 prevents reapplication of the normally applied source of idle-indicating battery potential, upon the restoration of release relay 302, thereby avoiding unnecessary current drain.

Following the described extension of the connection to the outgoing trunk OT1, the calling subscriber may dial the remaining digits in the desired number to cause the connection to be completed to the called line in the usual manner, line relay 110 responding to the further dialing to deliver the required local series of impulses.

When the connection is completed to the called line, ground potential is applied to the sleeve conductor thereof, operating cutoff relay 102' to disconnect the associated line-relay bridge.

After the called subscriber has been signalled in the usual manner and has answered, the talking connection is completed as indicated by the dotted connections. Talking current is supplied to the called line through back-bridge relay 112, being supplied to the calling line through the windings of line relay 110. The voice currents pass through the usual talking condensers 113 and 114.

When the conversation has been completed, the replacing of the receiver at the calling substation permits line relay 110 to restore, followed shortly by the restoration of release relay 111. When the latter relay restores, it removes the holding ground potential from the sleeve conductor of the established connection, whereupon magnets 601 and 501 and cutoff relay 102 restore, along with any holding magnets or cutoff relays at the finder stage, immediately clearing out the connection between the calling line and trunk OT1.

B. Figures 3 to 9

B1. *Seizure of incoming trunk IT1*

Referring now to Figs. 3 to 9, the operations involved in extending a connection through the selector switching system at the selector stage of Fig. 2 will be further given in detail.

When incoming trunk IT1 (Fig. 5) is idle, an idle-indicating battery potential is impressed on its sleeve conductor S as follows: from the ungrounded pole of the exchange battery, through the illustrated current-limiting resistor and normally closed make-busy contacts associated with off-normal stackup ON of switch PA1, a pair of normally closed contacts in the said stackup, guard conductor G in selector multiple SM1, back contact of armature 1 of release relay 302 of selector SEL—A1, and thence, over conductor S in selector multiple SM1, to sleeve conductor S of incoming trunk IT1.

Upon seizure of incoming trunk IT1, the bridging of the calling line across the tip and ring conductors T and R thereof closes an energizing circuit, through normally closed contacts in the associated stackup ON, and conductors T and R of SM1, for the windings of line relay 301. Line relay 301 thereupon operates, followed by the operation of slow-restoring release relay 302. At its armature 1, relay 302 disconnects the incoming sleeve conductor from the normally connected source of idle-indicating potential and substitutes a holding ground potential therefor, through which the partially established connection is temporarily maintained. At its armature 4, relay 302 closes a circuit, through contacts of busy relay 303, for hold winding H of magnet 351 of register 300; at its armature 5, it prepares an impulse circuit for operate winding 0 of register 300; at its armature 2, it applies ground potential to the common start lead ST to start the common tone apparatus (not shown); and, at its armature 3, it closes a connection between the associated ring conductor R and the common dial-tone lead DT, by way of condenser 306. A dial-tone signal is thereby transmitted back to the calling substation to inform the calling subscriber that he may begin to dial the digits in the desired number.

B2. *Dialing*

At this point, it should be noted that the register R300 is of the construction and operation disclosed in my prior application, Serial No. 493,312, filed July 2, 1943, now U. S. Patent No. Re. 23, 089. Briefly, the construction is such that energization of hold winding H of magnet 351 produces no immediate effect; transmission of the first impulse to winding 0 of magnet 351 causes simultaneous closure of off-normal contacts ON and of contacts 1 of the register; transmission of the second impulse causes separation of contacts 1 and the closure of contacts 2; transmission of the third impulse causes separation of contacts 2 and the closure of contacts 3, and so forth.

Upon the dialing of the first digit in the desired number, line relay 301 is momentarily restored a number of times corresponding to the digit value (1 to 0) thereof. Upon each restoration of line relay 301, release relay 302 is open-circuited. Being slow-restoring, release relay 302 remains operated notwithstanding.

Upon each momentary restoration of line relay 301, an impulse is transmitted to winding 0 of magnet 351. As above noted, contacts ON and 1 of register R300 close responsive to this impulse. Off-normal contacts ON remain closed thereafter, but delivery of a second impulse causes contacts 1 to open and contacts 2 to close. Each succeeding impulse causes the last closed pair of contacts to open and the next succeeding pair to close.

At the termination of the series of impulses, the one of contact pairs 1 to 0 of R300 which corresponds to the value of the dialed digit is in closed condition, the others being open.

In the present example, it may be assumed that the first digit dialed is the digit 1, in which case contacts ON and 1 of the register R300 are in closed condition at the termination of the dialing of the digit.

B3. *Termination of dialing*

Following closure of off-normal contacts ON of register 300, each reoperation of line relay 301 completes a circuit for start relay 304. Relay 304 is so designed and adjusted that it does not operate responsive to the momentary impulses it receives during the remaining portion of the dialing of the digit.

When line relay 301 comes to rest in an operated condition at the end of the dialing of the digit, start relay 304 operates fairly promptly. At its armature 3, relay 304 disconnects the impulse lead from the lower winding of magnet 351 and transfers it to busy relay 303, whereby the latter relay is operated in the event that, for any reason, the call does not clear through the selector stage before the calling subscriber starts to dial the next digit.

B4. *Generally preconditioning the secondary controllers*

At its armature 4, start relay 304 closes a point in the double-chain circuit (to be subsequently traced) to initiate the selecting and testing operations necessary to clear the call through the selector stage. At its armature 1, start relay 304 grounds the associated common test-start conductor T—ST. This conductor is grounded by the start relay of any selector in any subgroup. Conductor T—ST extends to common test-start relay 870 (Fig. 8) which now operates to ground conductors ST—A to ST—I in cables 711 to 719 respectively, one for each secondary controller. Grounding of these conductors causes each idle secondary controller to prepare to test any of its associated outgoing trunks in preparation for the extension of a connection over an idle one thereof.

If the secondary controller SCA (Fig. 8) is idle, both its group-controller relays 901 and 902 are in restored condition. In this event, the grounding of conductor ST—A in cable 711 closes a circuit through the winding of test-connecting relay 921, by way of the back contacts 6 of relays 901 and 902 in series. Relay 921 thereupon operates, and connects the test conductors S1 to S15 in cable 650 respectively to one terminal of the high-resistance test windings of relays T1 to T15.

None of the relays T1 to T15 of secondary controller SCA operates as the direct and immediate result of the described operation of test-connecting relay 921, as the other terminal of the test winding ( the lower winding) of each of these relays is devoid of operating ground potential except as such potential is supplied through contacts of a grouping relay such as 851 to 855, whereby the unnecessary operation of the test relays of all idle trunks in a secondary subgroup is avoided.

From the above, it will be seen that all idle secondary controllers are generally preconditioned, for completion of a call to any numerical group, upon the completion of the dialing of any digit at the selector stage.

B5. *The selector-subgroup chain*

Since the primary switches PA1 to PA15 with which the selectors SEL—A1 to SEL—A15 are respectively associated are controlled by the common selecting magnets 521 to 532, the common selecting magnets must be placed under control of calling selectors only one at a time in order to avoid confusion. To this end, each selector is provided with a chain relay such as 305 of SEL—A1, and the chain relays of the fifteen selectors in a subgroup are interconnected in a local subgroup chain. Assuming the selector-subgroup-A chain to be idle( none of the chain relays such as 305 energized) at the time start relay 304 operates as previously described, the closure of contacts 4 of the latter relay extends ground potential, through contacts 4 of busy relay 303, to the common input conductor of register R300 by way of the following circuit path: from ground through the winding of relay 411, chain-in conductor 312, back contact 4 of chain relay 305, the associated chain-out conductor CH—OUT, through the corresponding chain contacts of the succeeding chain relays such as 305, the associated chain-end conductor CH—END (being the chain-out conductor at the final selector SEL—A15 of the subgroup), normally closed contacts controlled by armature 3 of chain relay 305, conductor C2 in selector multiple SM1, normally closed contacts of stackup ON of switch PA1, conductor C1 in selector multiple SM1, and thence, by way of contacts 4 of relays 304 and 303, to the input conductor common to contact pairs 1 to 0 of the register R300.

The further extension of the above-noted ground potential at the moment depends upon whether the group controller (GC1, Fig. 7) associated with the called numerical group of trunks is busy or idle. If this group controller is busy, the ground potential in question is not operatively extended until the group controller becomes idle.

B6. *The group-controller chain*

The disclosed arrangement is such that a group controller can be associated with only one primary subgroup at a time in order to avoid confusion in the completion of connections. For this purpose, all relays such as 401 associated with the same group controller are included in a chain opened by any operated one to indicate that the group controller is busy.

Assuming that group controller GC1 is in idle condition at the moment, the above-noted extension of ground potential (by way of the windings of relays 411 and 305), to the input conductor common to contacts 1 to 0 of register R300 of the calling selector SA1, results in the closure of the following double-chain start circuit: from ground as previously traced to the common input conductor of register R300, and thence, through the closed contacts 1 of such register, over the selected dial lead DL1 (common to selectors SEL—A1 to SEL—A15), the winding of numerical-group relay 431, the winding of group-controller relay 401, normally closed contacts controlled by armature 46 of relay 401, the associated common conductor CH—END (being the end conductor of the group controller chain), through series contacts of relays such as 401 associated with the succeeding selector subgroups, chain-out conductor CH—OUT of relay 401, chain contacts 47 of relay 401, chain-in conductor CH—IN in cable 421, and thence through the winding of start relay 701 to battery. Relays 411, 305, 431, 401, and 701 all operate in series over the above-traced circuit.

B7. *Conditioning the selector links*

Relay 411, at its armatures 1 to 20, applies an idle-indicating battery potential to each of the conductors S1 to S20 in local cable 450, being the sleeve conductors S of the twenty selector links SL1 to SL20, respectively, extending from the associated primary subgroup A to the several secondary subgroups.

B8. *Individualizing the primary subgroup with the calling selector*

Relay 305, at its armature 3, locks itself to conductor 312, at the same time disconnecting its winding from the associated conductor CH—END. At its armature 4, relay 305 disconnects conductor 312 from conductor CH—END (common to the fifteen selectors of the subgroup), thereby precluding operation of any further chain relays of the selector subgroup for the time being. That is, the subgroup chain is now busied to the remaining fourteen selectors. At its armatures 1 and 2, relay 305 connects the associated switching conductor 310 and busy conductor 311 respectively to the operate winding of hold magnet 501 and the winding of busy relay 303.

B9. *Adapting the group controller according to the called numerical group*

Numerical-group relay 431 applies ground potential to conductor G1 in cable 421 thereby operating grouping relays 841 and 851 (Fig. 8). Relay 841 connects the conductor pairs A to I of group controller GC1, Fig. 7 respectively to pairs 1A to 1I in cables 711 to 719. This operation constitutes adaptation of the group controller GC1 to direct the call under discussion to an idle trunk in the called numerical group 1, as distinct from the other numerical groups (2 to 5) with which it can be adapted to operate by relays 842 to 845 respectively.

B9*a*. *Specifically conditioning the secondary controllers*

The stated operation of grouping relay 851 specifically conditions each idle secondary controller for operation in connection with the called numerical group 1. It accomplishes this by applying ground potential to the upper terminal of the lower winding of each test relay in any secondary controller associated with a trunk line assigned to the called numerical group 1. For example, at its contacts 2 and 1, relay 851 grounds conductors AT1 and AT2, thereby extending ground potential to the upper terminal of the lower winding of each of the test relays (T1 and T2) which are associated with trunks outgoing from secondary subgroup A and assigned to numerical group 1. At such of its remaining contacts as are needed for the purpose, relay 851 similarly applies ground potential to one terminal of the lower winding of each test relay (not shown) in the other secondary controllers associated with outgoing trunks assigned to the called numerical group 1. For convenience in altering assignment of the outgoing trunks to the numerical subgroups, conductors AT1 to IT15 in cables 711 to 719 are brought to terminal blocks 861 to 869, whence any one of them can be cross-connected to a contact pair of any one of the grouping relays 851 to 855, or to a contact pair of any one of the similar relays (not shown) controlled over conductors G6 to G0 (see Fig. 4), associated respectively with outgoing numerical groups 6 to 0.

As is shown in Fig. 1, the sleeve conductor S of each idle outgoing trunk is normally connected to an idle-indicating battery potential at the switching apparatus to which such trunk extends. Accordingly, the high-resistance lower winding of each of the trunk-test relays in each idle secondary subgroup (such as T1 and T2, Fig. 9) which corresponds to an idle outgoing trunk in the called numerical group 1 is energized, operating the concerned test relay. If outgoing trunk OT1 is idle, relay T1 has the following operating circuit: from ground through contacts 2 of grouping relay 851, conductor AT1 in cable 711, the high resistance lower winding of relay T1, contacts of the operated test-connecting relay 921, conductor S1 in cable 650, normally closed make-busy contacts associated with off-normal contacts ON of secondary switch SA1, the operating winding of hold magnet 601, and thence over sleeve conductor S of the outgoing trunk OT1 to the above-noted source of idle-indicating battery potential. Magnet 601 is not effectively energized by the closure of this circuit because of the above-noted high resistance of the lower winding of relay T1.

If the outgoing trunk assigned thereto is idle, test relay T2 (Fig. 9) operates over a circuit similar to that of relay T1. So does any test relay in the remaining secondary controllers which is associated with an idle trunk assigned to the called numerical group 1.

From the foregoing, it will be seen that all idle secondary controllers are now specifically conditioned to assist in the completion of a call to the called numerical group 1. It will be understood, of course, that all such secondary controllers can be contemporaneously specifically conditioned, by similar relay operations, to complete a call to any one of the numerical groups 6 to 0, presided over by group controller GC2. As will appear hereinafter, this causes no confusion, as the seizure of a secondary controller by either group controller excludes the other group controller therefrom and causes the call to be completed according to the destination of the call being handled by the seizing group controller.

B10. *Individualizing the group controller with the primary subgroup*

Relay 401, at its armature 44, locks itself to the associated chain-in conductor CH—IN, at the same time disconnecting its winding from the associated conductor CH—END (common to relays 401 in all selector subgroups). At its armature 47, relay 401 opens the chain circuit between conductors CH—IN and CH—END thereof, thereby precluding operation for the time being of any further chain relays such as 401 associated with the same group controller. At its armatures 1 and 2, relay 401 connects the subgroup busy and switching conductors 311 and 310 to conductors BU and SW of cable 421, extending to group controller GC1 (Fig. 7); at its armature 3, it connects primary off-normal lead PON in cable 450 with primary off-normal lead PON in cable 421; at its armatures 4 and 5 it connects the local subgroup mark conductors M1—10 and M11—20 respectively to the corresponding conductors in cable 421; while at its armatures 6 to 45, it connects the remaining conductors (M1 to S20) in local cable 450 to respective conductors in cable 421, extending to group controller GC1.

Conductors M1 to S20 of cable 450 comprise twenty pairs, each pair being associated with a separate one of the twenty links extending from the associated primary subgroup A to the several secondary subgroups. Conductors M1 and S1 comprise the first pair (associated with the first link); M2 and S2 comprise the second pair; and so forth, to M20 and S20, which comprise the twentieth pair (associated with the twentieth link). It should be noted further that, as indicated most clearly in Fig. 7, cable 421 (and the same is true for the similar cable 422) contains twenty-seven pairs of conductors 1A, 2A, and so forth, to 3I, each pair extending to a separate one of the twenty-seven link-test relays 1A to 3I. A separate combination of twenty of these test relays is used for each primary subgroup. The particular combination used for any primary subgroup is that combination which corresponds to the selector-link spread from that primary subgroup to the secondary subgroups, as given in Table 2, supra. Accordingly, at any selector subgroup, only twenty of the above-noted twenty-seven pairs of conductors 1A to 3I in cable 421 are brought out to the contacts of the concerned connecting relay such as 401. Table 3, below, shows the particular combination of the twenty-seven pairs of conductors in cable 421 which appears at the contacts of any relay such as 401.

TABLE 3

| Pairs | A | B | C | D | E | F | G | H | I |
|---|---|---|---|---|---|---|---|---|---|
| 1A | 1st | 19th | 17th | 15th | 13th | 11th | 9th | 7th | 4th |
| 2A | 2nd | 20th | 18th | 16th | 14th | 12th | 10th | 8th | 5th |
| 3A | 3rd | | | | | | | | 6th |
| 1B | 4th | 1st | 19th | 17th | 15th | 13th | 11th | 9th | 7th |
| 2B | 5th | 2nd | 20th | 18th | 16th | 14th | 12th | 10th | 8th |
| 3B | 6th | 3rd | | | | | | | |
| 1C | 7th | 4th | 1st | 19th | 17th | 15th | 13th | 11th | 9th |
| 2C | 8th | 5th | 2nd | 20th | 18th | 16th | 14th | 12th | 10th |
| 3C | | 6th | 3rd | | | | | | |
| 1D | 9th | 7th | 4th | 1st | 19th | 17th | 15th | 13th | 11th |
| 2D | 10th | 8th | 5th | 2nd | 20th | 18th | 16th | 14th | 12th |
| 3D | | | 6th | 3rd | | | | | |
| 1E | 11th | 9th | 7th | 4th | 1st | 19th | 17th | 15th | 13th |
| 2E | 12th | 10th | 8th | 5th | 2nd | 20th | 18th | 16th | 14th |
| 3E | | | | 6th | 3rd | | | | |
| 1F | 13th | 11th | 9th | 7th | 4th | 1st | 19th | 17th | 15th |
| 2F | 14th | 12th | 10th | 8th | 5th | 2nd | 20th | 18th | 16th |
| 3F | | | | | 6th | 3rd | | | |
| 1G | 15th | 13th | 11th | 9th | 7th | 4th | 1st | 19th | 17th |
| 2G | 16th | 14th | 12th | 10th | 8th | 5th | 2nd | 20th | 18th |
| 3G | | | | | | 6th | 3rd | | |
| 1H | 17th | 15th | 13th | 11th | 9th | 7th | 4th | 1st | 19th |
| 2H | 18th | 16th | 14th | 12th | 10th | 8th | 5th | 2nd | 20th |
| 3H | | | | | | | 6th | 3rd | |
| 1I | 19th | 17th | 15th | 13th | 11th | 9th | 7th | 4th | 1st |
| 2I | 20th | 18th | 16th | 14th | 12th | 10th | 8th | 5th | 2nd |
| 3I | | | | | | | | 6th | 3rd |

The above table shows that pair 1A is the 1st pair at selector subgroup A; is the 19th pair at selector subgroup B; the 17th at C; and so on. The table further shows that conductor pair 2A in cable 421 is the 2nd conductor pair at selector subgroup A; the 20th at B; the 18th at C; and so on. Each of the columns headed A to I shows what conductor pairs 1A to 3I appear at the corresponding selector subgroup, and in what order.

B11. *Preparing the group controller*

In group controller GC1 (Fig. 7), when start relay 701 operates as previously noted (in series with relays 411, 305, 431, and 401), it prepares a test circuit at its armature 2; at its armature 1, it closes a circuit through contacts of test relay 702 for busy relay 704. Relays 703 and 704 are both so designed and adjusted that neither has time to operate during the brief normal operation of the group controller. This intended operation will be described subsequently.

Assuming relays 718 to 730 of the preference allotter to be in the respective conditions indicated (relays 718 and 721 operated, the remaining restored), the operation of armature 3 of start relay 701 open-circuits relay 718 and closes an effective operating circuit for relay 719. Relay 719 thereupon operates, but without immediate effect. Relay 718 remains operated (to hold relay 721 operated) notwithstanding the fact that it is now open-circuited, for it is a residual relay (and the same is true for relay 719) as is hereinafter described.

B11*a*. *Setting the link-test relays*

As a result of the connecting up of the sleeve conductors S in the twenty pairs of conductors in cable 421 which appear in contacts of relay 401, in accordance with column A of the above Table 3, each concerned one of the link-test relays 1A to 3I of the group controller GC1 operates, subject to the selector link with which it is currently associated being idle. For example, if the first selector link SL1 extending from the concerned primary subgroup A, Fig. 5, is idle, there is no ground potential on the sleeve conductor thereof. Consequently, conductor S1 in cable 450 is ungrounded. In this event, the battery potential placed on this conductor through the resistor associated with the front contact of armature 1 of relay 411 passes effectively through the front contact of this armature to the said conductor and extends thence, through the operated armature 7 of relay 401, and over conductor S in group 1A of cable 421, to the upper terminal of the winding of link-test relay 1A in group controller GC1, providing an operating circuit for the said relay 1A, whose lower terminal is grounded. On the other hand, if the selector link in question is in use, a holding (and guarding) ground potential is maintained on the sleeve conductor S thereof, effectively neutralizing the above-noted idle-indicating battery potential, in which event the said relay 1A remains unoperated.

As will be seen from column A of Table 9, the twenty test relays of group controller GC1 which are effective in the present call (involving selector subgroup A and primary subgroup A) are relays 1A to 3A, relays 1B to 3B, relays 1C and 2C (not shown), and so on, to relays 1I and 2I. Each such relay is operated, or not (by a test connection similar to that for relay 1A), depending upon whether the selector link with which the relay is currently associated is idle or busy.

If relay 1A operates (indicating that the link with which it is currently associated is idle), at its armature 1, it disconnects magnet conductor M of pair GC1—A in cable 711 from the corresponding armatures of the associated relays 2A and 3A and transfers it to magnet conductor M in conductor pair 1A in case 421, being the magnet conductor of the selector link with which the relay is currently associated. This is merely a preparatory operation, becoming effective only in case the link in question is selected, depending in turn upon whether there is an idle outgoing trunk assigned to the called numerical group in secondary subgroup A, with which relays 1A to 3A of the group controller are associated.

B12. *Path selection*

At its armature 2, relay 1A prepares to ground switching conductor SW in cable 421, and at its armature 3 it connects the free terminal of the ground-connected test relay 702 to conductor IN in pair A of the group controller. This latter operation constitutes the testing operation determinative of which currently idle secondary subgroup in the order from A to I is the first subgroup containing the idle outgoing trunk assigned to the called numerical group, group 1 in the chosen example. With grouping relay 841 operated, conductor IN in pair A is connected, through contacts 1 of such relay, to conductor IN in pair 1A of cable 711. This latter conductor extends to the upper armature of test relay T1 in secondary controller SCA, for relay T1 is associated with trunk OT1 (Figs. 2 and 6) outgoing from secondary subgroup A and assigned to the called numerical group 1. In the illustrative wiring of secondary controller SCA, the first two trunks outgoing from secondary subgroup A are assigned to the first numerical group, the second two trunks to the second numerical group, and so on, to the fifth pair of trunks which are assigned to the fifth numerical group, the remaining five trunks outgoing from this secondary subgroup being assigned respectively to numerical groups 6 to 0.

If the two outgoing trunks in secondary subgroup A assigned to the currently called numerical group 1 are both in use, trunk-test relays T1 and T2 are both in restored condition, as hereinbefore explained. In this event, the ground potential applied (by way of the winding of test relay 702 and contacts of the operated relays 701, 718, 721, 1A, and 841) to conductor IN in pair 1A in cable 711, is extended, through back contacts of the upper armatures of relays T1 and T2, and thence over the associated conductor OUT, contacts 2 of grouping relay 841, and conductors OUT of pair A, to armature 3 of relay 1B, whereby secondary subgroup A is by-passed, and the control over trunk selection is transferred to secondary subgroup B, through which it may be transferred in a similar manner to any one of the succeeding secondary subgroups, to become effective at the first point where there is an idle selector link outgoing from the calling primary subgroup to an idle secondary subgroup containing an idle trunk assigned to the called numerical group.

B12a. *Selecting secondary controller SCA*

With link-test relay 1A operated as assumed, if either of test relays T1 and T2 is in operated condition (indicating an idle outgoing trunk leading from secondary subgroup A, to the called numerical group), incoming conductor IN in pair 1A of cable 711 is disconnected from outgoing conductor OUT of the same pair, and a selecting circuit is completed locally in the secondary controller SCA, through the upper winding of one or another of the relays T1 and T2.

If relay T1 is energized (by its high-resistance lower winding), the previously described operation of relay 1A completes the following selecting circuit: from ground through the winding of test relay 702, contacts 2 of start relay 701, front contact of armature 1 of relay 718, front contact of armature 2 of relay 734, front contact of armature 3 of relay 1A, conductor IN of pair A, contacts 1 of relay 841, conductor IN in group 1A of cable 711, front contact of the upper armature of trunk-test relay T1, the upper winding of relay T1, conductor 1 in cable 900, group-controller relay 901, and thence to battery through the back contact of armature 6 of relay 902. The closure of this circuit establishes a holding current through the upper winding of relay T1, and an operating current for test relay 702 and group-controller relay 801. Test relay 702 disconnects busy relay 704, and substitutes busy relay 703 for a purpose to be subsequently made clear.

B13. *Individualizing the secondary controller with the group controller*

Relay 901 opens the chain circuit of test-connecting relay 921 at its contacts 6. When this occurs, relay 921 restores and disconnects the lower windings of the fifteen trunk-test relays T1 to T15, whereupon any operated one of these relays restores, with the exception of relay T1, which is held by current flow through its upper winding over the above-traced circuit. Restoration of these relays operates to mark the secondary controller SCA (and consequently the corresponding secondary subgroup A of switches) as busy to the group controllers GC2, Fig. 2. This is done by joining incoming test conductor IN to outgoing test conductor OUT in each of the groups 6A to 0A in cable 711. Secondary controller SCA is now individualized with group controller GC1.

As a further result of its described operation, group-controller relay 901 causes connection to be made between the calling incoming trunk and the now-selected outgoing trunk OT1 by operation of its armatures 1 to 5. Its armature 1 closes one point in the prepared select-magnet circuit, to be subsequently traced; its armatures 5 and 4 connect common magnet conductors M1—10 and M11—20 of cable 650 (of secondary subgroup A) respectively to the corresponding conductors of the calling primary subgroup A, by way of conductors assigned to group controller GC1; its armature 3 interconnects the subgroup off-normal circuit branch of the calling primary subgroup in series with that of the called secondary subgroup; and its armature 2 prepares for operation of the hold magnet of the calling primary switch over conductor SW in cable 421.

B14. *Select-magnet operation*

With relay 901 operated in secondary controller SCA, Fig. 9, with relay 1A operated in group controller GC1, Fig. 7, and with relay 401, Fig. 4 operated, the following operating circuit is established for causing stackup selection to occur in the concerned primary and secondary subgroups: from ground through contacts 1 of group-controller relay 901, conductor M of pair GC1—A in cable 711, front contact of armature 1 of link-test relay 1A of group controller GC1, conductor M of pair 1A in cable 421, contact pair 6 of relay 401, conductor M1 in cable 450, lower winding of the 1st select magnet 521 of primary subgroup A, conductor M1 in spread cable 600, lower winding of the 1st select magnet 621 in secondary subgroup A, the winding of the 11th select magnet 631 of secondary subgroup A, a conductor M1—10 in cable 650, contacts 5 of group-controller relay 901, conductor 1 in cable 700, conductor M1—10 in cable 421, contact pair 4 of relay 401, conductor M1—10 in cable 450, and thence to battery through the winding of the 11th select magnet 531 of primary subgroup A. Primary select magnets 521 and 531 operate in the above-traced circuit to select selector link SL1 at primary subgroup A, and secondary select magnets 621 and 631 operate in the same series circuit to select the same selector link, SL1, in secondary subgroup A. Specifically selective stackups 1 and 11 are now selected in the apparatus of Fig. 5 and in the apparatus of Fig. 6.

B15. *Hold-magnet operation*

When the four select magnets 521, 631, 621, and 631 have operated, their respectively associated off-normal contacts complete circuits for operating the hold magnets of the concerned primary and secondary switches, PA1 and SA1. The operate circuit for SA1 is as follows: from ground through primary off-normal contacts PON1, 2 (associated with select magnets 531 and 532), primary off-normal contacts PON1, 2 (associated with select magnets 521 and 522), conductor PON in cable 450, contacts 3 of relay 401, conductor PON in cable 421, conductor 3 in cable 700 (extending in multiple to all relays such as 901 in the several secondary controllers), contacts 3 of group-controller relay 901, conductor SON—IN in cable 650, secondary off-normal contacts SON11, 12, secondary off-normal contacts SON1, 2, conductor SON—OUT in cable 650, the lower contacts of the locked-operated trunk-test relay T1, conductor S1 in cable 650, normally closed make-busy contacts associated with off-normal stackup ON of secondary switch SA1, the lower, or operating, winding of hold magnet 601, and thence to battery over the sleeve conductor S of the outgoing trunk OT1, the battery connection being as shown in Fig. 1. Magnet 601 operates over this circuit. At off-normal stackup ON of switch SA1, it connects its upper, or holding, winding to the sleeve conductor of the outgoing trunk to maintain itself operated (by ground potential to be placed immediately on this sleeve conductor) after its initial operating circuit is opened. The operation of magnet 601 also closes the selected stackups 1 and 11 of SA1, thereby connecting the tip, ring, and sleeve conductors of the secondary end of the selector link SL1 respectively to the tip, ring, and sleeve conductors of outgoing trunk OT1.

A branch of the above-traced operating circuit is simultaneously effective to operate primary switch PA1, the operating circuit for the latter being as follows: from ground, as previously traced, to conductor SON—OUT (Fig. 9), and thence through contacts 2 of relay 801, conductor SW of group GC1—A in cable 711, front contact of armature 2 of relay 1A, contacts 2 of relay 721, front contact 2 of relay 718, switching conductor SW in cable 421, contacts 2 of relay 401, local switching conductor 310 (common to all selectors in subgroup A), contacts 1 of chain relay 305, conductor SW in selector multiple SM1, and thence to battery through the upper, or operating, winding of hold magnet 501 of primary switch PA1. Upon operating, magnet 501 closes the associated selected stackups 1 and 11, thereby connecting the tip, ring, and sleeve conductors at the primary end of selector link SL1 respectively with the tip, ring, and sleeve conductors of the incoming trunk IT1. Since the sleeve conductor S of incoming trunk IT1 is currently maintained grounded, at the front contact of armature 1 of release relay 302, the said closure of the contacts in stackups 1 and 11, of switch PA1 extends a holding ground potential immediately over the sleeve conductor of the selector link SL1, to the sleeve conductor of the now-connected outgoing trunk OT1, thereby immediately completing a holding circuit for the upper winding of hold magnet 601 of selector SA1, through the off-normal stackup ON of the latter switch. At the same time, the off-normal stackup ON of switch PA1 is actuated, and the lower contact pair of this stackup closes a holding circuit, to the sleeve conductor of the incoming trunk, for magnet 501.

It will be noted that the described operation of primary switch PA1, by connecting ground potential to the sleeve conductor of selector link SL1, short-circuits the winding of the currently associated link-test relay 1A of group controller GC1. Relay 1A, however, does not restore immediately responsive to this operation, for a short-circuited relay is slow-restoring, as is well known.

B16. *Holding ground returned*

Responsive to the described extension of the connection through the selector stage from incoming trunk IT1, by way of selector link SL1, to the outgoing trunk OT1, line relay 110, Fig. 1, operates over the calling line, followed by the operation of release relay 111, to disconnect the normal source of idle-indicating potential, and to transfer the incoming sleeve conductor S to ground, providing a source of holding and guarding potential.

B17. *Clearing out the selector subgroup*

Clearing out of the common equipment temporarily individualized with the incoming trunk IT1 is initiated by separation of chain conductors C1 and C2 of selector multiple SM1 (Fig. 5) by the opening of the off-normal contact pair in stackup ON of switch PA1 in which they terminate. This operation open-circuits and restores relays 411, 305, 431, 401, and 701.

The selector subgroup chain is cleared out responsive to the restoration of chain relay 305. The associated chain-in conductor 312 is thereby again extended to conductor CH—END (common to all relays such as 305), through the chain contacts of the succeeding relays in the selector subgroup chain. At the same time, relay 411 disconnects the associated resistors from sleeve conductors S1 to S20 in cable 450.

B18. *Clearing out the group controller*

Relay 401 returns its associated circuit connections to normal condition, again connecting chain-in conductor CH—IN in cable 421 to the associated chain-end conductor CH—END (common to relay 401 and the other similar relays in the group-controller chain), placing the chain in its normal idle condition. Contacts 2 of relay 401 open the operating circuit of the now-locked hold magnet 501, while contacts 6 of relay 401 open-circuit magnets 521, 531, 621, and 631, clearing out the selecting apparatus at the primary and secondary subgroups.

In the group controller GC1, Fig. 7, start relay 701, at its armature 2, opens the previously traced test circuit, thereby initiating the clearing out of secondary controller SCA. At about the same time, all operated ones of the link-test relays 1A to 3I restore responsive to the restoration of relays 411 and 401.

B19. *Clearing out the secondary controller*

Responsive to the opening, at contacts 2 of relay 701, of the previously traced test circuit through the upper winding of relay T1 and the winding of relay 901, relays T1 and 901 restore, clearing out the secondary controller SCA.

Upon the restoration of group-controller relay 901, the battery-supply chain to the right-hand terminal of the winding of test-connecting relay 921 is again completed, permitting this relay to operate again immediately, to again complete test circuits for the lower windings of relays T1 to T15, subject to the continued grounded condition of the associated test-start lead T—ST, common to all selectors. Accordingly, if a start relay such as 304 is currently energized in any other selector (indicating that dialing has been completed in such selector), the secondary controller is again placed in readiness to assist in setting up the desired connection in a manner similar to that hereinbefore described.

B20. *Clearing out the selector*

A further result of the operation of off-normal stackup ON of primary switch PA1 is that the windings of line relay 301 of selector SEL—A1 are disconnected from in bridge of the tip and ring conductors of incoming trunk IT1 (being a cutoff-relay operation), and the guard conductor G in selector multiple SM1 is opened to avoid current drain through the associated resistor after the selector has cleared out.

In the selector SEL—A1 (Fig. 3), line relay 301 restores responsive to being disconnected at contacts of off-normal stackup ON of the associated primary switch PA1. Upon so doing, it open-circuits release relay 302 and start relay 304. Being slow restoring, release relay 302 remains operated for an interval sufficient to permit the previously described operation of relays 110 and 111 (Fig. 1) to occur.

Start relay 304 is rendered slightly slow in restoring by the resistance shunt placed around its winding at its contacts 2. Busy relay 303 is accordingly operated, through back contacts of line relay 301, and front contacts 5 and 3 of relays 302 and 304. Upon operating, relay 303 closes a self-locking circuit through its front contact 2, and contacts 4 of release relay 302, at the same time opening the holding winding H of register magnet 351, clearing out the register. The operation of busy relay 303, however, is merely incidental at this time, for the call has gone through successfully.

Start relay 304 restores a moment after busy relay 303 operates, leaving busy relay 303 locked operated. Still later, slow-restoring release relay 302 restores, unlocking and restoring busy relay 303, finally completing the clearing out of the selector SEL—A1.

B21. *Clearing out the established connection*

When the connection is to be cleared out, the replacing of the receiver at the calling substation results shortly in the removal of holding ground potential from the sleeve conductor S of the established connection (by restoration of relays 110 and 111, Fig. 1), thereby open-circuiting the holding windings of magnets 601 and 501. These magnets consequently deenergize, clearing out primary switch PA1 and secondary switch SA1.

B22. *Selecting other selector links*

Considering primary subgroup A as shown in Fig. 5, if any one of the second to tenth (SL2 to SL10) selector links accessible to this subgroup is to be connected with by one or another of the primary switches therein, one or another of the leads M2 to M10 in cable 450 becomes grounded in the manner pointed out hereinbefore for lead M1, causing energization of one or another of the select magnets 522 to 530 through its lower winding, indirectly in series with the 11th select magnet 531. The upper contact set is thereby selected in the corresponding one of the stackups 2 to 10 of the primary switches.

When any one of the eleventh to twentieth (SL11 to SL20) selector links accessible to this subgroup is to be connected with by one or another of the switches therein, the corresponding one of magnet conductors M11 to M20 in cable 450 becomes grounded, closing a circuit for the upper winding of the concerned one of magnets 521 to 530, indirectly in series with the 12th select magnet 532. As a result, the concerned incoming trunk is interconnected, through the lower set of contacts in the closed stackups 1 to 10, with the concerned one of the selector links SL11 to SL20.

In the secondary subgroup A, Fig. 6, the local arrangement is similar to that just described, except that the 11th select magnet 631 is directly (rather than indirectly) in series with the lower winding of each of the select magnets 621 to 630, and the 12th select magnet is directly in series with the upper winding of each of the select magnets 621 to 630.

As previously noted, each selector link contained in spread cable 600, Fig. 5 (such as any one of the selector links SL1 to SL20 of Fig. 5), is represented by, or includes, a correspondingly numbered magnet wire in the spread cable, the magnet wires for selector links SL1 to SL20 being wires M1 to M20, respectively, in cable 600. Each such magnet wire connects, at either end thereof, with a lower select-magnet winding, or with an upper select-magnet winding, depending upon whether the selector link which it represents is one reached through the upper portion, or the lower portion, of any stackup serving it in the banks of the concerned primary and secondary switches. Any such magnet wire therefore connects a winding of the concerned primary select magnet directly in series with the corresponding winding of the corresponding select magnet at the concerned secondary subgroup, thereby insuring selection at each end of any selector link of the stackup through which such link is reached. At any secondary subgroup, actuation of the required one of the 11th and 12th select magnets thereat (to insure selection of the required one of the selector-link pair selected by operation of any one of the first ten select magnets of the subgroup) is directly assured by the illustrated and previously described interconnections local to the secondary subgroup. If it were not for the fact that the corresponding ones of the 11th and 12th select magnets of the concerned primary subgroup must be operated, conductors M1—10 and M11—20 in cable 650 could be replaced by a battery connection. Such battery connection, however, is omitted at this point, and operating current supplied through the concerned one of the 11th and 12th select magnets of the calling primary subgroup, by way of conductor M1—10 or M11—20 in one or another of cables 421 and 422, depending upon which of the two group controllers is handling the connection being completed. Complete correspondence between the select-magnet operation at any primary subgroup and at the secondary subgroup with which it is temporarily individualized (through a group controller), is assured by carrying magnet conductors M1—10 and M11—20 at any secondary subgroup to contact pairs 5 and 4 of the group-controller relays 901 and 920 at the associated secondary controller; by there connecting them (through conductors in cable 700) respectively with conductors M1—10 and M11—20 in cable 421 or 422 (depending upon which group controller is handling the concerned connection); and by providing contact pairs 4 and 5 of relays 401 and 402 to connect conductors M1—10 and M11—20 of their respective cables 421 and 422 to the corresponding conductors in any cable 450, which extend to battery at the concerned primary subgroup, each through the corresponding one of the 11th and 12th select magnets 531 and 532 of such primary subgroup.

By the illustrated and described circuit arrangement for operating in series all four of the select magnets required for the establishment of any connection through the selector stage, the opening of a protecting current-supply fuse can have no direct effect upon any select-magnet circuit except in the case of the opening of such fuse at a primary subgroup in which case (among other things) no select-magnet circuit including any magnet of such primary subgroup can be closed. It is accordingly believed that the disclosed circuit arrangement in question entirely avoids the possibility of unwanted select-magnet operation over spurious paths, as when a protecting fuse opens.

B23. *Changing trunk assignments*

It will be clear from the foregoing description that any outgoing trunk can be assigned initially to any numerical group. The way in which any outgoing trunk can be later shifted from one numerical group to another will now be described with reference to outgoing trunk OT1 (Figs. 2 and 6). If, for example, outgoing trunk OT1 is to be removed from numerical group 1 and assigned to numerical group 0, the following steps may be taken: (1) trunk OT1 may first be marked busy to the common control apparatus by separating the make-busy contacts associated with off-normal stackup ON of switch SA1 (Fig. 6), preventing subsequent energization of the lower winding of the corresponding trunk-test relay T1 (Fig. 8) therethrough; (2) the indicated jumper connection at the intermediate distributing frame IDF (Fig. 2) may be changed to transfer outgoing trunk OT1 from a trunk path in cable 211 to a trunk path in cable 220 (numerical group 0); (3) the upper terminal of the upper winding of trunk-test relay T1 (Fig. 9) may now be disconnected from conductor 1 in cable 900 and transferred into connection with conductor 0 in this cable, thereby serially relating the upper winding of relay T1 with the winding of group-controller relay 802, associated with numerical group 0 of outgoing trunks; (4) conductor IN of pair 1A of cable 711 may be transferred, from in connection with the upper armature of relay T1, into connection with the upper armature of relay T2, and the connection between the back contact of the upper armature of relay T1 and the upper armature of relay T2 may be severed; (5) conductor IN of pair 0A of cable 711 may be removed from in connection with the upper armature of trunk-test relay T15 and transferred into connection with the upper armature of relay T1, and the back contact of the latter armature may be connected with the upper armature of relay T15; and (6) conductor AT1 of cable 711 may be transferred from the front contact of armature 2 of the first grouping relay 851 to a vacant front contact of the similar grouping relay (not shown) associated with group controller GC2 and the tenth outgoing numerical group.

When the foregoing connection changes have been made, relays T1 and T15 are interrelated with conductors IN and OUT of pair 0A in cable 711 in the same way that relays T1 and T2 are shown interrelated with the conductors comprising pair 1A of the said cable; relays T1 and T15 are jointly in circuit with relay 902 in the same way that relays T1 and T2 are shown jointly in circuit with relay 901; and, by the altered connection to conductor AT1, relay T1 is called into activity when group 0 is called rather than when group 1 is called.

When the foregoing changes have been made, the make-busy contacts associated with stackup ON of the concerned switch SA1 (Fig. 6) may be reclosed to render the concerned trunk OT1 again idle to the common switching apparatus. Henceforth, this trunk handles calls to numerical group 0, to which it has been newly assigned.

B24. *Traffic equalization*

The offered traffic is preferably more or less equalized among the several secondary subgroups by arranging each group controller so as to shift from one choice combination to the next succeeding one after each use thereof. Relays 718 to 730, as previously noted, are provided in the group controller GC1 of Fig. 7 for this purpose. With relay 721 in its illustrated operated condition, secondary subgroup A is first choice to the group controller; secondary subgroup B is then second choice, and so forth to secondary subgroup I, which is then last choice. When relay 722 energizes secondary subgroup B becomes first choice, with the succeeding secondary subgroups following in order, and secondary subgroup A is then last choice. When relay 723 (not shown) operates, at which time relay 721 restores, secondary subgroup C becomes first choice and secondary subgroup B becomes last choice, and so forth.

B24*a*. *Even and odd control relays*

Relays 721 to 730 are controlled by the pair of even and odd relays 718 and 719. With the relays of Fig. 7 in their respective operated or restored conditions an operating circuit exists for the upper winding of relay 718 through back contact 3 of start relay 701. The lower winding of relay 718 is not energized at this time because relay 719 is in restored condition.

When the next operation of start relay 701 occurs, armature 3 thereof open-circuits the upper winding of relay 718 and closes a circuit for relay 719. Because of its residual holding construction (as by being supplied with a hard-steel armature instead of one of soft iron), relay 718 remains in operated condition after the circuit of its upper winding is opened. Accordingly, the lower winding of relay 719 remains short-circuited at contacts 3 of relay 718, resulting in the energization of the upper winding of relay 719 alone. Being energized alone, the upper winding of relay 719 operates the said relay to connect the lower winding of relay 718 in parallel with the upper winding thereof, in preparation for its restoration.

When start relay 701 next restores, it open-circuits relay 719 and again closes a circuit for relay 718. Residual relay 719 remains operated, however, for reasons given in connection with relay 718. With relay 719 operated, both windings of relay 718 are energized at the same time. The two windings of this relay are differentially connected, as indicated. Moreover, the lower winding of relay 718 is slightly more powerful than the upper winding thereof, resulting in a mild reversed magnetomotive force. This reversed magnetomotive force is sufficient to overcome the residual magnetization of the relay, whereby relay 718 now restores, but the reversed magnetization is insufficient to cause reoperation of relay 718.

Upon the next ensuing operation of start relay 701, relay 718 is open-circuited and remains in restored condition.

With relay 718 in restored condition, and with start relay 701 in operated condition, the two windings of relay 719 are energized in series with each other. Under this condition, the lower winding somewhat more than over-balances the upper winding, causing a mild reversed magnetization sufficient to restore the relay, but insufficient to reoperate it. Relay 719 accordingly now restores. Relays 718 and 719 are thus both now in restored condition.

When start relay 701 again restores, the upper winding of relay 718 is again energized alone, causing reoperation of relay 718.

As succeeding operations and restorations of start relay 701 occur, even and odd relays 718 and 719 operate successively and restore successively in successive cycles of two group-controller operations each. Relay 718 accordingly assumes its illustrated operated position in the interval preceding each odd-numbered operation of the group controller, and assumes its restored condition in the interval preceding each even-numbered operation of the group controller.

Relay 718 controls three pairs of conductors. The first pair comprises odd relay-control conductor 736 and even relay-control conductor 737; the second pair comprises odd allotting conductors 733 and 734; and the third pair comprises even allotting conductors 731 and 732.

B24*b*. *Allotter-relay operation*

Even-odd relay 718, through the medium of conductors 736 and 737, causes relays 721 to 730 to operate successively in recurring cycles of ten group-controller operations each, as will now be explained.

*b*(1). CHOICE POSITION A

With relay 720 in its restored condition, as it is at the beginning of each cycle of operations of allotting relays 721 to 730, and with relay 718 in its illustrated operated condition, the lower winding of relay 721 is energized over odd conductor 736, and through contacts of the unoperated relay 720. Relay 721 thereupon assumes its illustrated operated condition. At its armatures 1 and 2, it allots first choice to the associated secondary subgroup A by connecting conductors 733 and 734 respectively to armatures 3 and 2 of link-select relay 1A, odd conductors 733 and 734 being currently connected to the common test and switch conductors through the front contacts of armatures 1 and 2 respectively of relay 718, while even conductors 731 and 732 stand open at the back contacts of these armatures.

At its armature 3, relay 721 prepares an operating circuit for relay 722 and a holding circuit for itself, subject to the restoration of relay 718.

*b*(2). CHOICE POSITION B

When relay 718 restores in the rest interval prior to the second group-controller operation of a cycle of ten such operations, it disconnects ground from odd conductor 736 and applies ground to even conductor 737. At the same time it disconnects odd conductors 733 and 734, and substitutes even conductors 731 and 732, thereby momentarily terminating choice allotment.

Armature 4 of relay 718 and its associated contacts comprise a make-before-break arrangement whereby there is a slight overlap interval during which conductors 736 and 737 are both grounded when relay 718 restores or operates. Accordingly, while the ungrounding of conductor 736 open-circuits the lower winding of relay 721, the grounding of conductor 737 previously closes a holding circuit for the upper winding thereof, which circuit includes contacts 3 of the operated relay 721, the lower (or operating) winding of relay 722, and the winding of relay 720. Relay 721 is held operated over this circuit to maintain the circuit of relay 722 intact. Relay 720 operates over this circuit, and as will subsequently appear, remains operated thereafter until near the end of the cycle of operations of relays 721 to 730. Relay 720 disconnects the operate winding of relay 721 from odd conductor 736 so as to prevent further energization thereof until a new allotting cycle begins.

Relay 722 now operates, through its lower winding, and relay 721 remains temporarily operated. With relay 718 restored to substitute even conductors 731 and 732 for odd conductors 733 and 734, relay 722 allots first choice to the second secondary subgroup B, which condition remains unchanged until the group controller is again used and cleared out. At its contacts 3, relay 722 prepares a holding circuit for itself and relay 720, and an operating circuit for the next succeeding relay 723 (not shown).

b(3). CHOICE POSITION C

When relay 718 next reoperates (in the non-use period preceding the third group-controller operation of the cycle), relay 723 (not shown) operates as explained for relay 722 to allot first choice (over conductors 733 and 734) to secondary subgroup C. Relays 722 and 720 remain operated over the new operating circuit, which includes odd conductor 736.

Relay 721 now restores, responsive to the removal of ground potential from conductor 737, opening its associated connections to the odd allotting conductors 733 and 734.

b(4). SUCCEEDING CHOICE POSITIONS

As the periods of group-controller use and non-use of the instant allotting cycle succeed each other, a new one of the relays 721 to 730 operates at the beginning of each period of non-use; the immediately preceding relay remains operated; and the relay preceding that restores, whereby first choice is allotted successively to the succeeding subgroups.

b(5). CHOICE POSITION I

The allotting operation continues in the manner indicated up to the operation of the ninth allotter relay 729 to allot first choice to secondary subgroup I, at which time the eighth allotter relay (not shown) remains operated, and the seventh allotter relay restores. Relay 720 is at this time maintained operated in the operating circuit of the lower winding of relay 729, and in series with the upper winding of the preceding relay 728 (not shown).

b(6). FINAL CHOICE POSITION

When relay 718 next restores (in the non-use period preceding the tenth, and final group-controller operation of the cycle), the resultant grounding of even conductor 736 operates relay 730, and holds relay 729, through contacts 3 of the latter relay. At the same time, the relay (not shown) immediately preceding relay 729 is open-circuited and restored. Relay 720 restores at this point since operating current for relay 730, and holding current for relay 729, is supplied directly to relay 729 rather than over conductor 735 and through the winding of relay 720. Circuit connections are thus prepared for the reoperation of relay 721 to begin a new cycle. It will be observed that relay 730 has its armatures 1 and 2 connected respectively with armatures 1 and 2 of relay 729, whereby the first-choice allotment of the final subgroup I remains during the tenth operation of the group controller. This arrangement is employed because there are an odd number of secondary subgroups. When there is an even number, such as ten, the final relay, such as 730, initially allots first choice to the final secondary subgroup rather than reallotting first choice thereto.

With relay 730 operated and relays 718 and 720 restored, the next reoperation of relay 718 begins a new cycle. At this time relay 730 restores to terminate choice allotment momentarily, and relay 721 reoperates through contacts of the restored relay 720 to begin a new cycle of choice-allotting operations.

It will be understood, of course, that group controller GC2 of Fig. 2 is provided with choice allotter equipment corresponding to relays 718 to 730 of group controller GC1. If desired, the connections between the armatures of the allotter relays and the chained contacts of the link-test relays 1A to 3I in group controller GC2 may be shifted by one or more secondary subgroups so as to avoid having both group controllers apply two successive first-choice allotments to the final secondary subgroup I.

A special feature of the choice allotter, including relays 718 to 730, is that the number of relay contacts is at a minimum, and that the back-contact chain common to relay allotters of this general character is entirely absent. The arrangement for temporarily holding any one of the relays 721 to 729 operated within the operating circuit of the next succeeding relay promotes general contact-pair economy. The elimination of the series back-contact chain results from providing relay 720, which disconnects the operate winding of the initial allotter relay 721 and maintains it disconnected until just prior to the time when it is to next operate.

B25. *Group-busy signalling*

As previously noted, each selector contains a busy relay, such as busy relay 303. This busy relay is operable from either connected group controller to return a group-busy signal to the calling line when, for any reason, the attempted connection cannot be completed to an idle trunk in the called numerical group. It may be assumed that the selector SEL—A1 (following the dialing of the digit 1) is individualized with the group controller GC1 of Fig. 7 as hereinbefore described, but that no path is available between the calling primary subgroup A and the desired called numerical group 1. In this event, no circuit is completed for test relay 702, wherefore the circuit of busy relay 704 remains established for a longer than normal interval. Slow-operating relay 704 accordingly has time to operate. Upon so doing, it applies ground potential to busy lead BU in cable 421, closing a circuit for busy relay 303 of selector SEL—A1, by way of contacts 1 of relay 401, and contacts 2 of relay 305. Relay 303 thereupon operates. At its armature 1, it disconnects dial-tone lead DT and substitutes busy-tone lead BT, whereby a busy signal is transmitted back to the calling substation to inform the calling subscriber of the busy condition. At its armature 4, busy relay 303 opens the previously traced chain circuit, immediately initiating the clearing out of the subgroup and group-controller chains. At its armature 3, relay 303 opens the operating circuit for the lower winding of magnet 351 to avoid transmitting further impulses to the said magnet in the event that the calling subscriber again operates his calling device in disregard of the busy signal. At its preliminary-make armature 2, busy relay 303 closes a self-locking circuit to ground through contacts 4 of release relay 302, at the same time open-circuiting the hold winding of register R300, clearing out the register.

When the calling subscriber subsequently replaces his receiver, line relay 301 restores, followed shortly by the restoration of release relay 302. At its armature 4, relay 302 open circuits and restores busy relay 303, while at armature 1 it disconnects conductor S in selector multiple SM1 from its source of holding ground potential, thereby removing ground potential from sleeve conductor S of the associated incoming trunk IT1. The partially established connection clears out in the usual manner responsive to this operation.

As previously noted, when test relay 702 operates, it disconnects slow-operating busy relay 704, as an indication that an idle path has been located from the calling primary subgroup, by way of an idle selector link, to an idle trunk line assigned to the called numerical group in one or another of the secondary subgroups. It may happen occasionally that a mechanical or circuit defect intervenes to prevent the establishment of a connection by way of the selected path. For example, it will be clear from the foregoing description that the desired connection cannot be completed until off-normal contacts have closed in the concerned primary and secondary subgroups. Accordingly, test relay 702 closes a circuit for slow-operating relay 703 when it disconnects slow-operating busy relay 704. If the selected connection is not completed promptly, relay 703 has time to operate before the group controller clears out. In this event, busy lead BU in cable 421 is grounded, causing busy relay 303 to operate as hereinbefore explained.

It should be noted that relays 703 and 704 can be replaced by a single relay, but two separate relays are considered preferable in that each can be accurately adjusted to allow just time enough for the concerned portion of the operation to occur and then promptly operate the busy relay of the calling selector when the concerned time limit is exceeded. This arrangement minimizes the time during which a subgroup chain, a group controller, and a secondary controller are monopolized by a call which cannot be completed.

B26. *Unused digits*

As previously noted, the arrangement of Figs. 2 to 8 provides for a maximum of ten numerical groups, one for each of the indexing digits 1 to 0 appearing on the dial of the usual automatic-telephone calling device. It frequently happens that a lesser number of numerical groups are in use. Then, one or more selector-stage digits are unused.

Fig. 3 indicates a simple arrangement for halting further progress of the connection and transmitting a busy signal back to the calling substation in the event that a calling subscriber dials an unused (or unassigned) selector-stage digit when the numerical groups in use are fewer than ten.

As is indicated by the note appearing in Fig. 3, for each unused (or unassigned) digit the corresponding contacts such as R300 are not multipled together vertically (as by the dial leads DL1 and DL0), but remain as individual contacts in each register such as R300. All such unmultipled individual contacts in register R300 are connected to lead X, extending to the winding of busy relay 303. The dialing of an unused digit results in the closure of the following circuit: from ground through the winding of relay 411, conductor 312, contacts 4 of chain relay 305 and the similar chain relays, conductor CH—END, contacts controlled by armature 3 of relay 305, conductors C2 and C1 in series (by way of off-normal contacts of switch PA1), contacts 4 of start and busy relays 304 and 303, the currently closed one of pairs 1 to 0 of the register R300, the associated lead X, and thence to battery through the winding of busy relay 303. Busy relay 303 is preferably of such high resistance that neither of the relays 411 and 305 operates in series therewith. Upon operating, relay 303 locks itself to ground through contacts 4 of release relay 302; closes a busy-tone circuit at the front contact of its armature 1; and opens the above-traced chain circuit at its contacts 4. Busy relay 303 restores as hereinbefore described, following the successive restoration of relay 301 and 302, when the calling subscriber replaces his receiver.

B27. *Premature dialing*

In the event that the calling subscriber begins to dial the next digit in the desired number before the selector-stage operations have been completed, the first momentary restoration of line relay 301 open-circuits start relay 304, and completes an energizing circuit for busy relay 303, through front contacts 5 and 3 of relays 302 and 303. Upon operating, busy relay 303 closes a self-locking circuit at its armature 2, at the same time clearing out the register R300. Contacts 4 of relay 303 immediately open the series chain circuits to initiate relinquishment of the common equipment. At the front contact of its armature 1, relay 303 returns a busy signal from busy-tone lead BT. Start relay 304 restores after a slight interval (being slowed by the resistance shunt connected by its contacts 2) and does not reoperate as register R300 is cleared out.

The selector and the partially established connection are cleared out as previously described when the calling subscriber replaces his receiver in response to the returned busy-tone signal.

I claim:

1. In a selector switching stage having first-order trunks incoming thereto and divided into subgroups, selector links thereat, and second-order trunks outgoing therefrom and divided into subgroups; switches for interconnecting the incoming trunks with the selector links, and for interconnecting the selector links with the outgoing trunks; selector links assigned to any subgroup of one order of trunks having common access, through concerned ones of said switches, to the trunks comprising such subgroup, and having access individually, through concerned ones of said switches, to separate ones of said subgroups of the other order of trunks; the second-order trunks being further divided into numerical groups each containing trunks outgoing from a plurality of said subgroups of such trunks; group controllers corresponding respectively to certain of the numerical groups, one group controller corresponding to each of a plurality of the numerical groups; means controlled over any calling first-order trunk for selecting any desired one of the numerical groups, means responsive thereto for seizing the corresponding group controller and for associating the calling trunk individually therewith; means dependent upon the selected numerical group being any one of those to which said one group controller corresponds for adapting such group controller specifically to such selected group; and means controlled by any seized group controller for operating the concerned switches to extend the calling trunk, by way of an idle selector link, to an idle trunk in any subgroup of second-order trunks, subject to any such second-order trunk being one which is outgoing to the selected numerical group, the last-named means being dependent upon the said operation of said adapting means when the called numerical group is one of those to which said one group controller corresponds.

2. In a selector switching stage having first-order trunks incoming thereto and divided into subgroups, selector links thereat, and second-order trunks outgoing therefrom and divided into subgroups; switches for interconnecting the incoming trunks with the selector links, and for interconnecting the selector links with the outgoing trunks; selector links assigned to any subgroup of one order of trunks having common access, through concerned ones of said switches, to the trunks comprising such subgroup, and having access individually, through concerned ones of said switches, to separate ones of said subgroups of the other order of trunks; the second-order trunks being further divided into numerical groups each containing trunks outgoing from a plurality of said subgroups of such trunks; group controllers corresponding respectively to separate pluralities of the numerical groups; means controlled over any calling first-order trunk for selecting any desired one of the numerical groups, means responsive thereto for associating the calling trunk individually with the group controller which corresponds to the concerned plurality of numerical groups and for adapting it specifically to the selected numerical group; and means controlled by the last said group controller, dependent upon its having been adapted to the selected numerical group, for operating the concerned switches to extend the calling trunk, by way of an idle selector link, to an idle trunk in any subgroup of second-order trunks, subject to any such second-order trunk being one which is outgoing to the selected numerical group.

3. In a selector switching stage having trunks incoming thereto, trunks outgoing therefrom divided into numerical groups, and switching apparatus for interconnecting calling incoming trunks respectively with outgoing trunks; group controllers corresponding respectively to certain of the numerical groups, one group controller corresponding to each of a plurality of the numerical groups; means controlled over any calling trunk for selecting any desired one of the numerical groups, means responsive thereto for seizing the corresponding group controller and for associating the calling trunk individually therewith; means dependent upon the selected numerical group being any one of those to which said one group controller corresponds for adapting such group controller specifically to such selected group; and means controlled by any seized group controller for operating said switching apparatus to extend the calling trunk to an idle trunk in the selected numerical group, the last-named means being dependent upon the said operation of said adapting means when the called numerical group is one of those to which said one group controller corresponds.

4. In a selector switching stage having trunks incoming thereto, trunks outgoing therefrom divided into numerical groups, and switching apparatus for interconnecting calling incoming trunks respectively with outgoing trunks; group controllers corresponding respectively to separate pluralities of the numerical groups; means controlled over any calling trunk for selecting any desired one of the numerical groups, means responsive thereto for associating the calling trunk individually with the group controller which corresponds to the concerned plurality of numerical groups and for adapting it specifically to the selected numerical group; and means controlled by the last said group controller, dependent upon its having been adapted to the selected numerical group, for operating the concerned switches to extend the calling trunk to an idle trunk in the selected numerical group.

5. In a selector switching stage having trunks incoming thereto, trunks outgoing therefrom, and switching apparatus for interconnecting calling incoming trunks respectively with outgoing trunks, the incoming trunks being divided into subgroups, the outgoing trunks being divided into numerical groups, a group controller for controlling the operation of the switching apparatus, means controlled over any calling incoming trunk for selecting any said numerical group, and means responsive thereto comprising means for seizing said group controller and further means for adapting it specifically to the selected numerical group to the exclusion of the remaining said numerical groups, said seizing means including a relay specific to the calling trunk and a further relay specific to the concerned subgroup of incoming trunks and common to all trunks thereof, and said adapting means including separate numerical-group relays for each said subgroup, such relays of any subgroup being common to all incoming trunks comprising it and being individual respectively to the numerical groups.

6. In a selector switching stage having trunks incoming thereto, trunks outgoing therefrom, and switching apparatus for interconnecting calling incoming trunks respectively with outgoing trunks, the outgoing trunks being divided into numerical groups, separate pluralities of test relays associated respectively with the numerical groups, a group controller for controlling the operation of the switching apparatus, means controlled over any calling incoming trunk for selecting any said numerical group, and means responsive thereto for seizing said group controller and for connecting therewith the plurality of test relays associated with the selected group, thereby adapting the group controller specifically to the selected numerical group.

7. In a selector switching stage having trunks incoming thereto, selector links thereat, trunks outgoing therefrom, and switching apparatus for interconnecting calling incoming trunks respectively with selector links and for interconnecting selector links respectively with outgoing trunks, the incoming trunks and selector links being divided into subgroups, the outgoing trunks being divided into numerical groups, separate pluralities of test relays associated respectively with the numerical groups, a group controller for controlling the operation of the switching apparatus and containing link-test relays, means controlled over any calling incoming trunks for selecting any said numerical group, means responsive thereto for seizing the group controller and for associating the selector links of the concerned subgroup thereof respectively with link-test relays of the group controller and for interconnecting contacts of the link-test relays with contacts of the plurality of test relays associated with the selected numerical group, the group controller being thereby adapted specifically to the selected numerical group.

8. In a selector switching stage having trunks incoming thereto, selector links thereat, trunks outgoing therefrom, and switching apparatus for interconnecting calling incoming trunks respectively with selector links and for interconnecting selector links respectively with outgoing trunks, the incoming trunks and selector links being divided into subgroups, the outgoing trunks being divided into numerical groups, separate pluralities of trunk-test relays associated respectively with the numerical groups, link-test relays common to all subgroups of selector links, means controlled over any calling incoming trunks for selecting any said numerical group, means responsive thereto for operatively associating the selector links of the concerned subgroup with the common link-test relays and for interconnecting contacts of the link-test relays with contacts of the plurality of trunk-test relays associated with the selected numerical group, and means controlled through the said interconnected contacts for operating the switching apparatus to extend the calling trunk to an idle trunk in the selected group by way of an idle selector link.

9. In a selector switching stage having trunks incoming thereto, trunks outgoing therefrom, and switching apparatus for interconnecting calling incoming trunks respectively with outgoing trunks, the outgoing trunks being divided into numerical groups, normally ineffective trunk-test relays equal in number to the total of said outgoing trunks and corresponding respectively to the outgoing trunks, said trunk-test relays thus being also divided into said numerical groups, means controlled over any calling incoming trunk for selecting any numerical group, means responsive thereto for operatively associating the outgoing trunks of the selected group with their respective trunk-test relays, and means controlled through contacts of such relays for operating the switching apparatus to extend the calling incoming trunk to an idle trunk in the selected numerical group.

10. In a selector switching stage having trunks incoming thereto, selector links thereat, trunks outgoing therefrom, and switching apparatus for interconnecting calling incoming trunks respectively with selector links and for interconnecting selector links respectively with outgoing trunks, the outgoing trunks being divided into numerical groups, normally ineffective trunk-test relays corresponding respectively to the outgoing trunks, link-test relays, means controlled over any calling incoming trunk for selecting any said numerical group, means responsive thereto for operatively associating the trunks of the selected group with their respective trunk-test relays, for operatively associating selector links respectively with link-test relays, and for interconnecting contacts of the link-test relays with contacts of the last-named trunk-test relays, and means controlled through contacts of the link-test relays and contacts of the last-named trunk-test relays for operating the switching apparatus to extend the calling incoming trunk to an idle trunk in the selected numerical group by way of an idle selector link.

11. In a switching system, lines divided into pairs, a group of selective switches having common access to said lines, select magnets corresponding respectively to said pairs of lines, each select magnet having windings corresponding respectively to the lines of the corresponding pair, means for closing an energizing circuit for any one of said windings, means including the concerned select magnet responsive to such closure for selecting the corresponding line in all idle switches, means for operating any idle switch, and means responsive thereto for making connection between the operated switch and the selected line.

12. In a switching system, lines divided into pairs, a group of selective switches having common access to said lines, pair-select magnets corresponding respectively to said pairs of lines, a line-select magnet corresponding to the second line of a pair, each pair-select magnet having first and second windings corresponding respectively to the first and second lines of the corresponding pair, said line-select magnet having a winding included in circuit with the second winding of each pair-select magnet and excluded from the circuit of each of the first windings, means for closing an energizing circuit for any one of said windings of the pair-select magnets, means responsive to such closure, and including the concerned select magnet or select magnets, for selecting the corresponding line in all idle switches, means for operating any idle switch, and means responsive thereto for making connection between the operated switch and the selected line.

13. In a switching system, lines divided into pairs, a group of selective switches having common access to said lines, first selective means common to all said switches for physically selecting any pair of lines in all idle ones of said switches, second selective means for physically selecting either said line to the exclusion of the other in the pair selected in any switch, means for predetermining the respective settings of the first and second selective means in accordance with the line to be selected, and means including electrical contacts controlled by the first and second selective means for operating an idle switch to connect with the selected line.

14. In a switching system, two groups of switches, the switches of either group having common access to a plurality of circuit paths, at least one of the circuit paths being common to both groups, each group of switches having its own set of select magnets, the magnets of either set comprising magnets for selecting respective pairs of circuit paths, and at least one other magnet for selecting a specific circuit path of any such pair, means for operating the said select magnets of either group to effect selection of any said circuit path thereat, such means being effective when a circuit path common to both groups is to be used for so operating the said select magnets at each group as to effect selection thereof, and means in each group for operating any switch thereof to make connection with any said circuit path selected thereat.

15. In a switching system, a group of primary switches and a group of secondary switches interconnected in tandem by links and divided respectively into primary and secondary subgroups, all switches of any said subgroup having common access to a plurality of the links, the links being so spread between the two groups of switches that links accessible to the switches of any subgroup extend respectively to the subgroups of the other group, each subgroup of switches having its own set of select magnets, comprising magnets for selecting respective pairs of the links and at least one other magnet for selecting a specific link of any such pair, means for predetermining any said link, means for so operating the select magnets at the concerned primary and secondary subgroups as to select said predetermined link at each, and means for operating any switch at the last-named primary subgroup and any switch at the last-named secondary subgroup to effect a tandem connection by way of the last-named link.

16. In a switching system, two groups of switches interconnected by links and divided respectively into primary and secondary subgroups, all switches of any said subgroup having common access to a plurality of the links, the links being so spread between the two groups of switches that links accessible to the switches of any subgroup extend respectively to the subgroups of the other group, each subgroup of switches having its own set of select magnets, comprising magnets for selecting respective pairs of the links and a pair of other magnets for selecting the respective links of any such pair, means for predetermining any said link, means for so operating the select magnets at the concerned primary subgroup and at the concerned secondary subgroup as to select said predetermined link at each, and means for operating any switch at the last-named primary subgroup and any switch at the last-named secondary subgroup to effect a tandem connection by way of the last-named link.

17. In a switching system, two groups of switches interconnected by links and divided respectively into subgroups, all switches of any said subgroup having common access to a plurality of the links, the links being so spread between the two groups that links accessible to the switches of any subgroup extend respectively to the subgroups of the other group, each subgroup of switches having its own set of select magnets, comprising magnets for selecting respective pairs of the links and at least one other magnet for selecting a specific link of any such pair, means rendering any switch operable to connect with any link selected by the select magnets of its subgroup, and operating circuits for the select magnets corresponding respectively to said links, each such circuit including in series windings of such of the select magnets at the two subgroups between which it extends as are necessary to effect selection thereof at both subgroups.

18. In a switching system, two groups of switches interconnected by links and divided respectively into subgroups, all switches of any said subgroup having common access to a plurality of the links, the links being so spread between the two groups that links accessible to the switches of any subgroup extend respectively to the subgroups of the other group, each subgroup of switches having its own set of select magnets, comprising pair-select magnets for selecting respective pairs of the links and at least one group-select magnet for selecting a specific link of any such pair, means rendering any switch operable to connect with any link selected by the select magnets of its subgroup, and operating circuits for the select magnets corresponding respectively to said links, any such circuit including windings of the concerned pair-select magnets at the two subgroups between which it extends, in series with any group-select magnets necessary to the selection of the corresponding link at both subgroups.

19. In a switching system as set forth in claim 18, any said operating circuit including fixed circuit connections between the concerned pair-select magnets and any concerned group-select magnet at the concerned subgroup of one group of switches, and variable circuit connections between the group-select magnets of one group of switches and the group-select magnets of the other group of switches.

20. In a switching system, two groups of switches interconnected by links and divided respectively into subgroups, all switches of any said subgroup having common access to a plurality of the links, the links being so spread between the two groups that links accessible to the switches of any subgroup extend respectively to the subgroups of the other group, each subgroup of switches having its own set of select magnets, comprising magnets for selecting respective pairs of the links and at least one other magnet for selecting a specific link of any such pair, means rendering any switch operable to connect with any link selected by the select magnets of its subgroup, and operating circuits for the select magnets corresponding respectively to said links, each such circuit including a single fused current-supply lead, specific to one of the concerned subgroups, and the windings of such of the select magnets at the two subgroups between which the corresponding link extends as are necessary to effect selection thereof at both subgroups.

21. In a switching system, a first group of switches and a second group of switches interconnected by links and divided respectively into subgroups, all switches of any said subgroup having common access to a plurality of the links, the links being so spread between the two groups that links accessible to the switches of any subgroup extend respectively to the subgroups of the other group, each subgroup of switches having its own set of select magnets, comprising pair-select magnets for selecting respective pairs of the links and at least one group-select magnet for selecting a specific link of any such pair, means rendering any switch operable to connect with any link selected by the select magnets of its subgroup, individual magnet conductors included respectively in said links, any such conductor passing serially through a pair-select-magnet winding at each concerned subgroup, means for predetermining any said link, means associated with the first group of switches for applying one pole of a current source to the associated end of the said individual magnet conductor for the predetermined link, the individual magnet conductors at any subgroup of the second group of switches being connected together to form a pair of group magnet conductors serving as return paths to the other pole of the current source, such conductors at any subgroup of the second group of switches corresponding respectively to the first link and the second link of any pair accessible to the switches thereof, at least one of the said group magnet conductors at any subgroup passing serially through a winding of a group-select magnet thereat, and means for extending at least one of the said group magnet conductors at the subgroup in the second group serving said predetermined link to the said other pole of the current source serially through a winding of a group-select magnet at the concerned subgroup of the first group of switches.

22. In a switching system, a first group of switches and a second group of switches interconnected by links and divided respectively into subgroups, all switches of any said subgroup having common access to a plurality of the links, the links being so spread between the two groups that links accessible to the switches of any subgroup extend respectively to the subgroups of the other group, each subgroup of switches having its own set of select magnets for selecting any link thereat, such magnets having windings corresponding respectively to such links, means rendering any switch operable to connect with any link selected by the select magnets of its subgroup, magnet conductors included respectively in said links, any such conductor passing serially through a said winding at each concerned subgroup, means for predetermining any said link, means associated with the first group of switches for applying one pole of a current source to the associated end of the said magnet conductor of the predetermined link, the said magnet conductors at any subgroup of the second group of switches being connected together to form a normally open common return conductor specific to the subgroup, and means for closing the normally open return conductor of the subgroup of the second group of switches serving the predetermined link to the other pole of the current source.

23. In a switching stage having a group of first lines divided into primary subgroups, a group of second lines divided into secondary subgroups, links interconnecting each primary subgroup with each secondary subgroup, switching apparatus at each said subgroup for interconnecting the lines thereat with the links thereat, a group controller for controlling the establishment of connections successively, each such connection being between a first line and an idle second line over an idle link, means associated with the group controller for making a preferential test, in a predetermined order, of the secondary subgroups and of the links extending thereto incidental to the controlling of the establishment of any said connection, and means for so shifting said predetermined order as to offer generally the same preference to all secondary subgroups.

24. In a switching stage having a group of first lines divided into primary subgroups, a group of second lines divided into secondary subgroups, links interconnecting each primary subgroup with each secondary subgroup, switching apparatus at each said subgroup for interconnecting the lines thereat with the links thereat, group controllers each for controlling the establishment of connections successively, each such connection being between a first line and an idle second line over an idle link, means associated with each group controller for making a preferential test, in a predetermined order, of the secondary subgroups and of the links extending thereto incidental to the controlling of the establishment of any said connection under its control, and separate means for each group controller for so shifting said predetermined order as to offer generally the same preference to all secondary subgroups with respect to connections controlled by such group controller.

25. In a switching stage having a group of first lines divided into primary subgroups, a group of second lines divided into secondary subgroups, links interconnecting each primary subgroup with each secondary subgroup, switching apparatus at each said subgroup for interconnecting the lines thereat with the links thereat, a group controller and means for taking it for use when a connection is to be established, such group controller thereupon controlling the establishment of a connection between a first line and an idle second line over an idle link, means associated with the group controller for making a preferential test in a predetermined order of the secondary subgroups and of the links extending thereto incidental to its said operation upon being taken for use, and means operable during periods when the group controller is not in use for so shifting said predetermined order as to offer generally the same preference to all secondary subgroups.

JOHN I. BELLAMY.

REFERENCES CITED

The following references are of record in the file of this patent:

UNITED STATES PATENTS

| Number | Name | Date |
|---|---|---|
| 1,515,674 | Goodrum | Nov. 18, 1924 |
| 1,533,182 | Goodrum | Apr. 14, 1925 |
| 1,568,039 | Williams et al. | Dec. 29, 1925 |
| 1,600,444 | Williams | Sept. 21, 1926 |
| 1,645,972 | Rousseau | Oct. 18, 1927 |
| 2,004,599 | Carpenter | June 11, 1935 |
| 2,054,910 | Nelson | Sept. 22, 1936 |
| 2,089,338 | Carpenter | Aug. 10, 1937 |
| 2,093,117 | Carpenter | Sept. 14, 1937 |
| 2,193,427 | Marrison | Mar. 12, 1940 |
| 2,235,803 | Carpenter | Mar. 18, 1941 |
| 2,236,276 | Stewart | Mar. 25, 1941 |
| 2,237,906 | King | Apr. 8, 1941 |
| 2,291,481 | McDavitt | July 28, 1942 |
| 2,311,800 | Williams | Feb. 23, 1943 |
| 2,322,563 | Bruno | June 22, 1943 |
| 2,354,660 | Bellamy | Aug. 1, 1944 |
| 2,400,530 | Bellamy | May 21, 1946 |
| 2,421,717 | Saunders | June 3, 1947 |